(12) United States Patent
Nagatani et al.

(10) Patent No.: US 10,648,653 B2
(45) Date of Patent: May 12, 2020

(54) WAVELENGTH CONVERSION DEVICE, ILLUMINATION DEVICE, AND PROJECTOR

(71) Applicant: SEIKO EPSON CORPORATION, Tokyo (JP)

(72) Inventors: Kaname Nagatani, Matsumoto (JP); Kazuya Usuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/767,128

(22) PCT Filed: Oct. 13, 2016

(86) PCT No.: PCT/JP2016/004572
§ 371 (c)(1),
(2) Date: Apr. 9, 2018

(87) PCT Pub. No.: WO2017/064866
PCT Pub. Date: Apr. 20, 2017

(65) Prior Publication Data
US 2019/0072264 A1 Mar. 7, 2019

(30) Foreign Application Priority Data

Oct. 16, 2015 (JP) .................. 2015-204367
Oct. 16, 2015 (JP) .................. 2015-204368
Oct. 16, 2015 (JP) .................. 2015-204369

(51) Int. Cl.
*F21V 29/65* (2015.01)
*F21V 29/502* (2015.01)
(Continued)

(52) U.S. Cl.
CPC ............. *F21V 29/502* (2015.01); *F21S 2/00* (2013.01); *F21V 7/22* (2013.01); *F21V 29/65* (2015.01);
(Continued)

(58) Field of Classification Search
CPC .. G03B 21/16; G03B 21/2033; G03B 21/204; H04N 9/3144; H04N 9/3164; H04N 5/74;
(Continued)

(56) References Cited

U.S. PATENT DOCUMENTS

| 6,561,655 B2 * | 5/2003 | Onishi | G03B 21/16 353/52 |
| 2005/0128441 A1 * | 6/2005 | Morgan | H04N 9/3138 353/102 |

(Continued)

FOREIGN PATENT DOCUMENTS

| CN | 104676492 A | 6/2015 |
| JP | 2005-121250 A | 5/2005 |

(Continued)

OTHER PUBLICATIONS

Dec. 13, 2016 International Search Report issued in International Patent Application No. PCT/JP2016/004572.
(Continued)

*Primary Examiner* — Anh T Mai
*Assistant Examiner* — Fatima N Farokhrooz
(74) *Attorney, Agent, or Firm* — Oliff PLC

(57) ABSTRACT

A wavelength conversion device, an illumination device, and a projector that can efficiently cool a phosphor. A wavelength conversion device includes a substrate including a phosphor layer in which a phosphor is included, a rotating device configured to rotate the substrate, a circulating device that circulates a cooling gas to the substrate, and a housing configured to house the substrate and the circulating device. The housing includes a partition wall configured to separate a first space in which the cooling gas is circulated to the substrate by the circulating device and a second space in which the cooling gas radially delivered from the substrate according to the rotation of the substrate circulates.

10 Claims, 15 Drawing Sheets

(51) Int. Cl.
| | |
|---|---|
| *F21S 2/00* | (2016.01) |
| *F21V 7/22* | (2018.01) |
| *G03B 21/16* | (2006.01) |
| *H04N 5/74* | (2006.01) |
| *F21V 29/67* | (2015.01) |
| *F21V 29/71* | (2015.01) |
| *F21V 29/76* | (2015.01) |
| *F21V 29/78* | (2015.01) |
| *G03B 21/20* | (2006.01) |

(52) U.S. Cl.
CPC .............. *F21V 29/67* (2015.01); *F21V 29/71* (2015.01); *F21V 29/76* (2015.01); *F21V 29/78* (2015.01); *G03B 21/16* (2013.01); *G03B 21/204* (2013.01); *H04N 5/74* (2013.01)

(58) Field of Classification Search
CPC .......... F21V 29/502; F21V 7/22; F21V 29/65; F21V 29/67; F21V 29/71; F21V 29/76; F21V 29/78; F21S 2/00
See application file for complete search history.

(56) References Cited

U.S. PATENT DOCUMENTS

| | | |
|---|---|---|
| 2012/0013854 A1 | 1/2012 | Nishimura et al. |
| 2013/0301237 A1 | 11/2013 | Finsterbusch et al. |
| 2014/0362350 A1* | 12/2014 | Takamatsu ............. G02B 7/006 353/31 |
| 2015/0029472 A1 | 1/2015 | Lin et al. |
| 2016/0069558 A1 | 3/2016 | Hu et al. |
| 2016/0291449 A1 | 10/2016 | Masuda |
| 2018/0066835 A1* | 3/2018 | Kobayashi ................ F21V 9/40 |
| 2018/0095348 A1* | 4/2018 | Asano .................... G03B 21/16 |

FOREIGN PATENT DOCUMENTS

| | | |
|---|---|---|
| JP | 2011-075898 A | 4/2011 |
| JP | 2012-018762 A | 1/2012 |
| JP | 2012-181309 A | 9/2012 |
| JP | 2014-503110 A | 2/2014 |
| JP | 2014-092599 A | 5/2014 |
| JP | 2014-146056 A | 8/2014 |
| WO | 2014/173234 A1 | 10/2014 |
| WO | 2015/087406 A1 | 6/2015 |

OTHER PUBLICATIONS

May 8, 2019 Search Report issued in European Patent Application No. 16855120.8.

* cited by examiner

WAVELENGTH CONVERSION DEVICE, ILLUMINATION DEVICE, AND PROJECTOR

BACKGROUND

Technical Field

The present invention relates to a wavelength conversion device, an illumination device, and a projector.

Related Art

There has been known a projector that modulates light emitted from a light source to form an image corresponding to image information and enlarges and projects the formed image on a projection surface such as a screen.

As such a projector, there is known a projector including a fluorescent light emitting device excited by incident excitation light to emit fluorescent emission light and a plurality of cooling fans. For example, JP-A-2011-75898 (hereinafter, "Related art 1") discloses such a projector as a reference.

As such a projector, there is known a projector that forms an image using yellow fluorescent light generated by irradiating laser light on a phosphor layer. For example, JP-A-2014-146056 (hereinafter, "Related art 2") discloses such a projector as a reference.

The projector described in Related art 1 includes a light source unit, a display element, and a projection optical system. The light source unit includes a blue light source device, a fluorescent light emitting device, and a red light source device. Among these devices, the fluorescent light emitting device includes a fluorescent wheel on which a fluorescent light emitting region where a layer of a green phosphor is formed and a diffusion transmission region where blue emission light from the blue light source device is diffused and transmitted are juxtaposed in a circumferential direction. A part of laser light in a blue wavelength band emitted from the blue light source device is made incident on the fluorescent light emission region, whereby a bundle of rays (green light) in a green wavelength band is generated. A part of the laser light is made incident on the diffusion transmission region, whereby diffusion transmission light (blue light) in the blue wavelength band is generated. Light in a red wavelength band (red light) emitted from the red light source device traces optical paths of the blue light and the green light with a dichroic mirror and the like. These color lights are sequentially made incident on the display element, whereby an image is formed.

Note that, since high power laser light emitted from the blue light source device is made incident on the fluorescent light emission region and the diffusion transmission region, the temperatures of these regions rise. Besides, a wheel motor that rotates the fluorescent wheel, on which these regions are juxtaposed, is also a heat generation source. Therefore, in the projector described in PTL 1 described above, a cooling fan that directly blows outdoor air of the projector as cooling wind is provided. The cooling fan cools the fluorescent wheel and the wheel motor with the cooling wind.

The projector described in Related art 2 includes a light source device including a light source, a collimate lens, a light condensing lens, a phosphor wheel (a wavelength conversion member), a pickup lens, and a driving section and a casing that houses these on the inside. In this light source device, laser light emitted from the light source is collimated and condensed by the collimate lens and the light condensing lens and is made incident on a phosphor layer of the phosphor wheel rotated by the driving section. Fluorescent light generated by the incidence of the laser light is condensed by the pickup lens and emitted as illumination light.

Note that, in the casing, a phosphor-wheel housing section, in which the phosphor wheel is housed, is a sealed space blocked from an external space. Consequently, dust is prevented from directly adhering to the surface of the phosphor layer. Deterioration in use efficiency of light is prevented.

In recent years, in response to demands for a reduction in the size of a projector, there has been proposed a method of reducing the sizes of components disposed in the projector and achieving a reduction in the size of the entire projector.

Therefore, in the projector described in PTL 2 described above, it is conceivable to form a part of the casing in an arcuate shape extending along a rotating direction of a rotating substrate and reduce the casing in size.

SUMMARY

However, in the case of a configuration for blowing the cooling wind against the fluorescent wheel and cooling the fluorescent wheel while rotating the fluorescent wheel like the projector described in Related art 1 described above, heat of the fluorescent wheel is conducted and the cooling wind radially discharged from the fluorescent wheel is sucked according to the rotation of the fluorescent wheel and circulates to the fluorescent wheel side again. Therefore, there is a problem in that the temperature of the cooling wind circulating to the fluorescent wheel rises and it is hard to efficiently cool the fluorescent wheel, that is, the fluorescent light emission region including the phosphor.

In the projector described in Related art 1 described above, since the cooling wind circulates along a rotation axis of the fluorescent wheel, the cooling wind blown against the fluorescent wheel diffuses. Therefore, there is a problem in that it is hard to conduct the heat of the fluorescent wheel, that is, the heat generated in the fluorescent light emission region to the cooling wind and it is hard to cool the fluorescent light emission region.

In the configuration in which the casing is reduced in size in the projector described in Related art 2, there is a problem in that a part of a cooling gas radially discharged from the phosphor wheel stagnates between the phosphor wheel and an arcuate portion of the casing and is less easily discharged and cooling efficiency of the phosphor wheel and cooling efficiency of the phosphor layer are deteriorated.

An object of the present invention is to solve at least a part of the problems. One of objects of the present invention is to provide a wavelength conversion device, an illumination device, and a projector that can efficiently cool a phosphor. One of the objects is to provide a wavelength conversion device, an illumination device, and a projector that can improve cooling efficiency. One of the objects is to provide a wavelength conversion device, an illumination device, and a projector that can improve cooling efficiency while achieving a reduction in size.

A wavelength conversion device according to a first aspect of the present invention includes: a substrate including a phosphor layer in which a phosphor is included; a rotating device configured to rotate the substrate; a circulating device that circulates a cooling gas to the substrate; and a housing configured to house the substrate and the circulating device. The housing includes a partition wall configured to separate a first space in which the cooling gas is circulated to the substrate by the circulating device and a second space in which the cooling gas radially delivered from the substrate according to the rotation of the substrate circulates.

According to the first aspect, the housing, in which the substrate and the circulating device are housed, includes the partition wall configured to separate the first space on the circulating side of the cooling gas to the substrate and the second space on the discharge side of the cooling gas from the substrate. Consequently, it is possible to prevent the cooling gas radially discharged from the substrate, that is, the cooling gas served for the cooling of the substrate from circulating to the first space side while keeping heat to be circulated to the substrate again. Therefore, since it is possible to prevent the cooling gas having heat from circulating to the substrate, it is possible to efficiently cool the substrate and the phosphor of the phosphor layer included in the substrate.

In the first aspect, it is preferable that the partition wall includes an opening section for circulating the cooling gas to the substrate, and an opening shape of the opening section substantially coincides with a rotation range of the substrate.

With such a configuration, it is possible to surely circulates, via the opening section, the cooling gas circulated by the circulating device to the substrate. Since the dimension of the opening section substantially coincides with the rotation range of the substrate, it is possible to prevent the cooling gas radially discharged during the rotation of the substrate from being caused to flow into the first space. Therefore, it is possible to prevent a cooling gas having a relatively high temperature from circulating to the substrate. Consequently, it is possible to surely circulate a cooling gas having a relatively low temperature to the substrate. Therefore, it is possible to more efficiently cool the phosphor.

In the first aspect, it is preferable that the substrate includes, on a surface against which the cooling gas is blown, a plurality of fins extending from a center side toward an outer side of the substrate.

With such a configuration, it is possible to increase, with the plurality of fins, a contact area with the cooling gas on the substrate. It is possible to efficiently conduct the heat of the substrate to the cooling gas.

Since each of the plurality of fins extends from the center side toward the outer side of the substrate, the cooling gas is easily radially discharged according to the rotation of the substrate. Therefore, it is possible to prevent the cooling gas, which has cooled the substrate to have heat, from stagnating around the substrate.

In the first aspect, it is desirable that each of the plurality of fins has a shape warping to the opposite side of the rotating direction of the substrate from the center side toward the outer side of the substrate.

With such a configuration, it is possible to make it easy to radially discharge the cooling gas having heat from the substrate. When the cooling gas circulates along the substrate in the opposite direction of the rotating direction in a certain portion of the substrate, since the fins and the cooling gas collide to be opposed to each other, it is possible to efficiently cool the fins with the cooling gas. Therefore, it is possible to more efficiently cool the substrate and the phosphor.

In the first aspect, it is preferable that the wavelength conversion device includes a heat absorbing device configured to absorb heat of the cooling gas, the heat absorbing device includes a heat receiver disposed on an intake side of the circulating device and configured to receive heat from the circulating cooling gas, and the heat receiver includes a first channel in which the cooling gas inside the first space circulates and a second channel in which the cooling gas inside the second space circulates.

With such a configuration, since the heat of the cooling gas served for the cooling of the substrate is conducted to the heat receiver of the heat absorbing device, it is possible to cool the cooling gas. Therefore, it is possible to reduce the temperature of the cooling gas circulating to the substrate. It is possible to more efficiently cool the substrate.

The heat receiver includes not only the second channel in which the cooling gas discharged from the substrate, that is, the cooling gas having the heat of the substrate circulates but also the first channel in which the cooling gas in the first space circulates. Consequently, it is possible to further reduce the temperature of the cooling gas circulated to the substrate by the circulating device. Therefore, it is possible to more efficiently cool the substrate and the phosphor.

In the first aspect, it is preferable that the heat absorbing device includes a heat conduction member connected to the heat receiver and configured to conduct heat conducted to the heat receiver to an outside of the housing.

Note that, as the heat conduction member, a heat pipe and a thermoelectric element such as a Peltier element can be illustrated.

With such a configuration, since it is possible to conduct heat conducted from the cooling gas to the heat receiver to the outside of the housing with the heat conduction member, it is possible to surely reduce the temperature of the cooling gas inside the housing. Therefore, it is possible to more efficiently cool the substrate to which the cooling gas is circulated and the phosphor.

In the first aspect, it is preferable that the heat conduction member includes a first heat conduction member disposed in the first channel and a second heat conduction member disposed in the second channel, and the second heat conduction member has a larger contact area with the heat receiver than the first heat conduction member.

Note that, when the heat pipe is adopted as the heat conduction member, by increasing a sectional area in contact with the heat receiver or increasing the number of adopted heat pipes, it is possible to increase a contact area of the heat conduction member with the heat receiver. On the other hand, when the thermoelectric element is adopted, by increasing the number of adopted thermoelectric elements or adopting a thermoelectric element having a large area, it is possible to increase the contact area of the heat conduction member with the heat receiver.

The cooling gas discharged from the substrate circulates in the second channel. Therefore, the temperature of the cooling gas circulating in the second channel is higher than the temperature of the cooling gas circulating in the first channel.

On the other hand, in the configuration explained above, the contact area of the second heat conduction member disposed in the second channel with the heat receiver is larger than the contact area of the first heat conduction member disposed in the first channel with the heat receiver. Consequently, it is possible to efficiently conduct heat conducted to the heat receiver to the outside of the housing. It is possible to efficiently cool the cooling gas with the heat receiver. Therefore, it is possible to circulate a cooling gas having a lower temperature to the substrate. It is possible to more efficiently cool the phosphor.

In the first aspect, it is preferable that the heat receiver includes a segmenting section connected to the partition wall and configured to partition the first channel and the second channel.

With such a configuration, it is possible to prevent the cooling gas circulating in the second channel from circulating in the first channel. Consequently, it is possible to efficiently receive heat from the cooling gas circulating in the channels.

Note that, when the wavelength conversion device includes the heat conduction member including the first heat conduction member and the second heat conduction member and the contact area of the second heat conduction member with the heat receiver is larger than the contact area of the first heat conduction member with the heat receiver, it is possible to prevent the cooling gas circulating in the second channel from circulating in the first channel having the small contact area with the first heat conduction member. Therefore, it is possible to efficiently conduct heat conducted from the cooling gas circulating in the second channel to the outside of the housing. It is possible to efficiently cool the cooling gas.

In the first aspect, it is preferable that the housing is a sealed housing.

When relatively intense excitation light is made incident on the phosphor layer, a phenomenon called optical dust collection easily occurs. When dust is easily collected in this way, use efficiency of the excitation light is deteriorated. Besides, it is highly likely that a deficiency occurs in the rotation of the substrate by the rotating device.

On the other hand, with the configuration explained above, it is possible to prevent dust from intruding into the housing. Therefore, it is possible to prevent deterioration in the use efficiency of the excitation light. Besides, it is possible to configure the wavelength conversion device having high reliability.

When the wavelength conversion device includes the heat absorbing device including the heat receiver and the heat receiver is disposed inside the housing, it is possible to surely reduce the temperature of the cooling gas circulating in the housing and circulating to the substrate.

An illumination device according to a second aspect of the present invention includes: the wavelength conversion device; and a light source section configured to emit light made incident on the wavelength conversion device.

According to the second aspect, it is possible to achieve the same effects as the effects of the wavelength conversion device according to the first aspect.

A projector according to a third aspect of the present invention includes: the illumination device; an image forming device configured to form an image using light emitted from the illumination device; and a projection optical device configured to project the formed image.

According to the third aspect, it is possible to achieve the same effects as the effects of the illumination device according to the second aspect.

A wavelength conversion device according to a fourth aspect of the present invention includes: a substrate including a phosphor layer in which a phosphor is included; a rotating device configured to rotate the substrate; a circulating device configured to circulate a cooling gas to the substrate; and a housing configured to house the substrate and the circulating device. When the substrate is viewed along a rotation axis of the substrate, in a part in a circumferential direction of the substrate, the cooling gas circulated by the circulating device circulates in an opposite direction of a rotating direction of the substrate in the part.

According to the fourth aspect, when viewed along the rotation axis of the substrate, in a part in the circumferential direction of the substrate, the cooling gas circulated by the circulating device circulates in the opposite direction of the rotating direction of the substrate in the part. Consequently, since the cooling gas circulates along the surface of the substrate, compared with when the cooling gas is blown against the substrate along the rotation axis, it is possible to extend a time in which the cooling gas is in contact with the surface of the substrate. Besides, since the cooling gas circulates in a direction against the rotation of the substrate in the part, it is possible to increase relative flow velocity of the cooling gas with respect to the substrate. Therefore, it is possible to efficiently cool the substrate.

In the fourth aspect, it is preferable that, when the substrate is viewed along the rotation axis, the housing includes an arcuate section located on an outer side of the substrate and extending along a circumferential direction during the rotation of the substrate.

With such a configuration, it is possible to circulate the cooling gas circulated to the substrate in the circumferential direction of the substrate along the arcuate section. Therefore, in the part in the circumferential direction of the substrate, by rotating the substrate in the opposite direction of the circulating direction of the cooling gas, it is possible to surely circulate the cooling gas in the opposite direction of the rotating direction of the substrate. Therefore, it is possible to efficiently cool the substrate.

In the fourth aspect, it is preferable that the circulating device includes a discharge port for discharging the cooling gas, and, when the substrate is viewed along the rotation axis, the discharge port is disposed to be shifted with respect to an imaginary line that passes a center of the substrate and crosses the arcuate section.

With such a configuration, since the discharge port is disposed to be shifted with respect to the imaginary line, it is possible to circulate the cooling gas discharged from the discharge port while deviating the cooling gas to one side of the substrate with respect to the imaginary line. Therefore, since the cooling gas easily circulates along the arcuate section, by rotating the substrate such that the circulating direction of the cooling gas and the rotating direction of the substrate are opposite directions in the part, it is possible to more surely circulate the cooling gas in the opposite direction of the rotating direction of the substrate. Therefore, it is possible to more surely achieve the effects explained above.

In the fourth aspect, it is preferable that the wavelength conversion device includes an attachment member disposed inside the housing and configured to attach the rotating device to the housing, the substrate includes, on a surface to which the cooling gas is circulated from the circulating device, a plurality of fins extending from the center side toward the outer side of the substrate, and, when the substrate is viewed along the rotation axis, the attachment member is located in a position further on the center side of the substrate than the plurality of fins on the substrate.

With such a configuration, since each of the plurality of fins extends from the center side toward the outer side of the substrate, it is possible to make it easy to radially discharge the cooling gas according to the rotation of the substrate. Therefore, it is possible to prevent the cooling gas, which has cooled the substrate to have heat, from stagnating around the substrate.

In the part on the substrate, since the circulating direction of the cooling gas and the rotating direction of the substrate are the opposite directions, it is possible to cause the cooling gas and the fins to collide to be opposed to each other. Therefore, it is possible to more efficiently cool the fins with the cooling gas. It is possible to efficiently cool the phosphor.

Further, since the attachment member is disposed in the position, it is possible to prevent the plurality of fins from being covered by the attachment member. Consequently, it is possible to prevent a flow of the cooling gas circulating to the fins from being hindered by the attachment member. It is possible to surely circulate the cooling gas along the surface of the substrate on which the plurality of fins are located.

In the fourth aspect, it is preferable that the attachment member has a columnar shape.

Note that, as the columnar shape, a cylindrical shape or a polygonal shape is desirable. In the case of the polygonal shape, the number of corners is desirably large.

With such a configuration, even when a part of the cooling gas circulates along the attachment member, for example, compared with when the attachment member projects to the channel side of the cooling gas, it is possible to prevent the flow of the cooling gas from being hindered. Therefore, it is possible to smoothly circulate the cooling gas to the substrate.

In the fourth aspect, it is preferable that the housing includes a partition wall configured to separate a first space in which the cooling gas is circulated to the substrate by the circulating device and a second space in which the cooling gas radially delivered from the substrate circulates.

With such a configuration, since it is possible to divide the cooling gas circulating toward the substrate and the cooling gas discharged from the substrate, it is possible to prevent these cooling gases from colliding with each other. Therefore, it is possible to surely circulate the individual cooling gases. Besides, it is possible to prevent the cooling gas discharged from the substrate from circulating to the substrate again while keeping the heat. Therefore, it is possible to improve cooling efficiency of the substrate and the phosphor.

In the fourth aspect, it is preferable that the housing is a sealed housing.

When relatively intense excitation light is made incident on the phosphor layer, a phenomenon called optical dust collection easily occurs. When dust is easily collected in this way, use efficiency of the excitation light is deteriorated. Besides, it is highly likely that a deficiency occurs in the rotating device.

On the other hand, with the configuration explained above, it is possible to prevent dust from intruding into the housing. Therefore, it is possible to prevent deterioration in the use efficiency of the excitation light. Besides, it is possible to configure the wavelength conversion device having high reliability.

In the fourth aspect, it is preferable that the wavelength conversion device includes a heat absorbing device configured to absorb heat of the cooling gas.

With such a configuration, since the heat of the cooling gas is absorbed by the heat absorbing device, it is possible to reduce the temperature of the cooling gas circulating to the substrate. Therefore, it is possible to further improve the cooling efficiency of the substrate.

An illumination device according to a fifth aspect of the present invention includes: the wavelength conversion device; and a light source section configured to emit light made incident on the wavelength conversion device.

According to the fifth aspect, it is possible to achieve the same effects as the effects of the wavelength conversion device according to the fourth aspect.

A projector according to a sixth aspect of the present invention includes: the illumination device; an image forming device configured to form an image using light emitted from the illumination device; and a projection optical device configured to project the formed image.

According to the sixth aspect, it is possible to achieve the same effects as the effects of the illumination device according to the fifth aspect.

A wavelength conversion device according to a seventh aspect of the present invention includes: a substrate configured to rotate around a rotation axis extending along a first direction; a plurality of fins located on a first surface, which is one surface on the substrate, and extending from a center side toward an outer side of the substrate; a phosphor layer located in either one of the first surface and a second surface on an opposite side of the first surface; a rotating device configured to rotate the substrate; a delivering device configured to deliver the cooling gas to the first surface; and a housing in which the substrate is disposed on an inner side. The housing includes: a first side surface section opposed to the second surface; and a second side surface section that crosses the first side surface section and includes an arcuate section extending along a circumferential direction during the rotation of the substrate disposed on the inner side when viewed along the first direction. A radius of an arc of the arcuate section is set larger than a radius during the rotation of the substrate. When a 12 o'clock direction among radial directions during the rotation of the substrate viewed from the first direction side is set as a second direction and either one of a 3 o'clock direction and a 9 o'clock direction viewed from the first direction side is set as a third direction, a center of the arc of the arcuate section is located on the third direction side with respect to the rotation axis. The substrate is rotated counterclockwise by the rotating device when viewed from the first direction side.

According to the seventh aspect, the plurality of fins extending from the center side toward the outer side of the substrate are located on the first surface of the substrate. Therefore, the cooling gas delivered to the first surface by the delivering device and served for the cooling of the substrate is radially discharged according to the rotation of the substrate by the rotating device.

When the radius of the arc of the second side surface section is larger than the radius during the rotation of the substrate and the center of the arc of the second side surface section is not located on the third direction side or the opposite side of the third direction side with respect to the rotation axis of the substrate and is shifted to the opposite side of the second direction side, the cooling gas discharged to a region where the distance between the rotated substrate and the second side surface section is the closest, that is, a region on the second direction side with respect to the substrate (in detail, a region deviating to the opposite direction of the rotating direction of the substrate in the region) less easily circulates to the opposite direction side of the second direction and easily stagnates in that place. A factor of this is that a region (a first region) between the second side surface section on the third direction side and the substrate and a region (a second region) between the second side surface section on the opposite side of the third direction side and the substrate have the same size.

On the other hand, according to the seventh aspect, the center of the arc of the second side surface section having the radius larger than the radius during the rotation of the substrate is located in the third direction with respect to the rotation axis of the substrate. Therefore, the size of the first region is larger than the second region. In the cooling gas radially discharged from the substrate, an amount of the cooling gas passing the first region and circulating to the opposite direction side of the second direction is larger than an amount of the cooling gas passing the second region and circulating to the opposite direction side. The rotating direction of the substrate is the counter clockwise when viewed from the first direction side. Therefore, in the cooling gas discharged from the substrate, a flow velocity of the air circulating in the first region is higher than a flow velocity of the air discharged to the second region.

Consequently, the sizes and the flow velocities of the circulating cooling gas are different in the first region and the second region. Therefore, the cooling gas discharged from the substrate to the region where the distance between the rotating substrate and the second side surface section is the closest easily circulates to one of the first region and the second region. Therefore, it is possible to prevent a stagnation place of the cooling gas (a stagnation place of the cooling gas discharged from the substrate), which occurs when the size of the first region and the size of the second region are equal, from occurring. It is possible to reduce the stagnation place even when the stagnation place occurs. Consequently, it is possible to make it easy to circulate (discharge) the cooling gas discharged from the substrate according to the rotation of the substrate to the opposite direction side of the second direction from the first region and the second region. It is possible to quickly discharge the cooling gas that has cooled the substrate. Therefore, since the housing can be configured along the circumferential direction of the rotated substrate, it is possible to improve cooling efficiency of the substrate and cooling efficiency of the phosphor layer while achieving a reduction in the size of the housing.

It is possible to increase, with the plurality of fins, the contact area with the cooling gas on the substrate. It is possible to efficiently conduct the heat of the substrate to the cooling gas.

In the seventh aspect, it is preferable that the housing includes a partition wall opposed to the first side surface section across the substrate and connected to the second side surface, and the partition wall includes an opening section for circulating the cooling gas to the first surface.

With such a configuration, it is possible to prevent the air, which has cooled the substrate and is radially discharged, from being sucked according to the rotation of the substrate and circulated to the first surface side again while keeping heat. Therefore, since it is possible to prevent the cooling gas having heat from circulating to the substrate, it is possible to efficiently cool the substrate and the phosphor of the phosphor layer included in the substrate.

In the seventh aspect, it is preferable that each of the plurality of fins has a shape warping to the opposite side of the rotating direction of the substrate from the center side toward the outer side of the substrate.

With such a configuration, since each of the plurality of fins has the shape, it is possible to make it easy to radially discharge the cooling gas according to the rotation of the substrate. Therefore, it is possible to surely prevent the cooling gas, which has cooled the substrate to have heat, from stagnating around the substrate.

Note that, when the cooling gas circulates along the substrate in the opposite direction of the rotating direction in a certain part of the substrate, the fins and the cooling gas collide to be opposed to each other in the part, it is possible to more efficiently cool the fins with the cooling gas. Therefore, it is possible to more efficiently cool the substrate and the phosphor.

In the seventh aspect, it is preferable that the wavelength conversion device includes a heat receiver disposed inside the housing and configured to receive heat from the circulating cooling gas discharged according to the rotation of the substrate, the heat receiver includes a channel for circulating the cooling gas discharged according to the rotation of the substrate and guiding the cooling gas to the delivering device, and the housing is a sealed housing.

As explained above, when relatively intense excitation light is made incident on the phosphor layer, a phenomenon called optical dust collection easily occurs. When dust is easily collected in this way, use efficiency of the excitation light is deteriorated. Besides, it is highly likely that a deficiency occurs in the rotation of the substrate by the rotating device.

On the other hand, with the configuration explained above, it is possible to prevent dust from intruding into the housing. Therefore, it is possible to prevent deterioration in the use efficiency of the excitation light. Besides, it is possible to configure the wavelength conversion device having high reliability.

The heat receiver includes a channel for receiving heat from the cooling gas, which has cooled the substrate, and guiding the cooling gas after the heat reception to the delivering device. Therefore, it is possible to reduce the temperature of the cooling gas delivered to the substrate. Therefore, it is possible to further improve the cooling efficiency of the substrate.

In the seventh aspect, it is preferable that the wavelength conversion device includes a suction device located on an opposite direction side of the second direction with respect to the substrate when viewed along the first direction and configured to suck the cooling gas discharged according to the rotation of the substrate.

With such a configuration, the suction device located on the opposite direction side of the second direction with respect to the substrate sucks the cooling gas that has cooled the substrate. Therefore, it is possible to specify a circulating direction of the cooling gas after the cooling of the substrate in the opposite direction of the second direction. Therefore, it is possible to make it easy to circulate the cooling gas after the cooling in the opposite direction of the second direction from the first region and the second region. It is possible to quickly discharge the cooling gas. Therefore, it is possible to more suitably achieve the effects explained above.

Note that such a suction device and the delivering device can be configured by one fan disposed inside the housing. In such a case, it is possible to suitably achieve the effects explained above without increasing the number of components.

An illumination device according to an eighth aspect of the present invention includes: the wavelength conversion device; and a light source section configured to emit light made incident on the wavelength conversion device.

According to the eighth aspect, it is possible to achieve the same effects as the effects of the wavelength conversion device according to the seventh aspect.

A projector according to a ninth aspect of the present invention includes: the illumination device; an image forming device configured to form an image using light emitted from the illumination device; and a projection optical device configured to project the formed image.

According to the ninth aspect, it is possible to achieve the same effects as the effects of the illumination device according to the eighth aspect.

DESCRIPTION OF EXEMPLARY EMBODIMENTS

First Embodiment

A first embodiment of the present invention is explained below with reference to the drawings.

[Schematic Configuration of a Projector]

Figure 1:
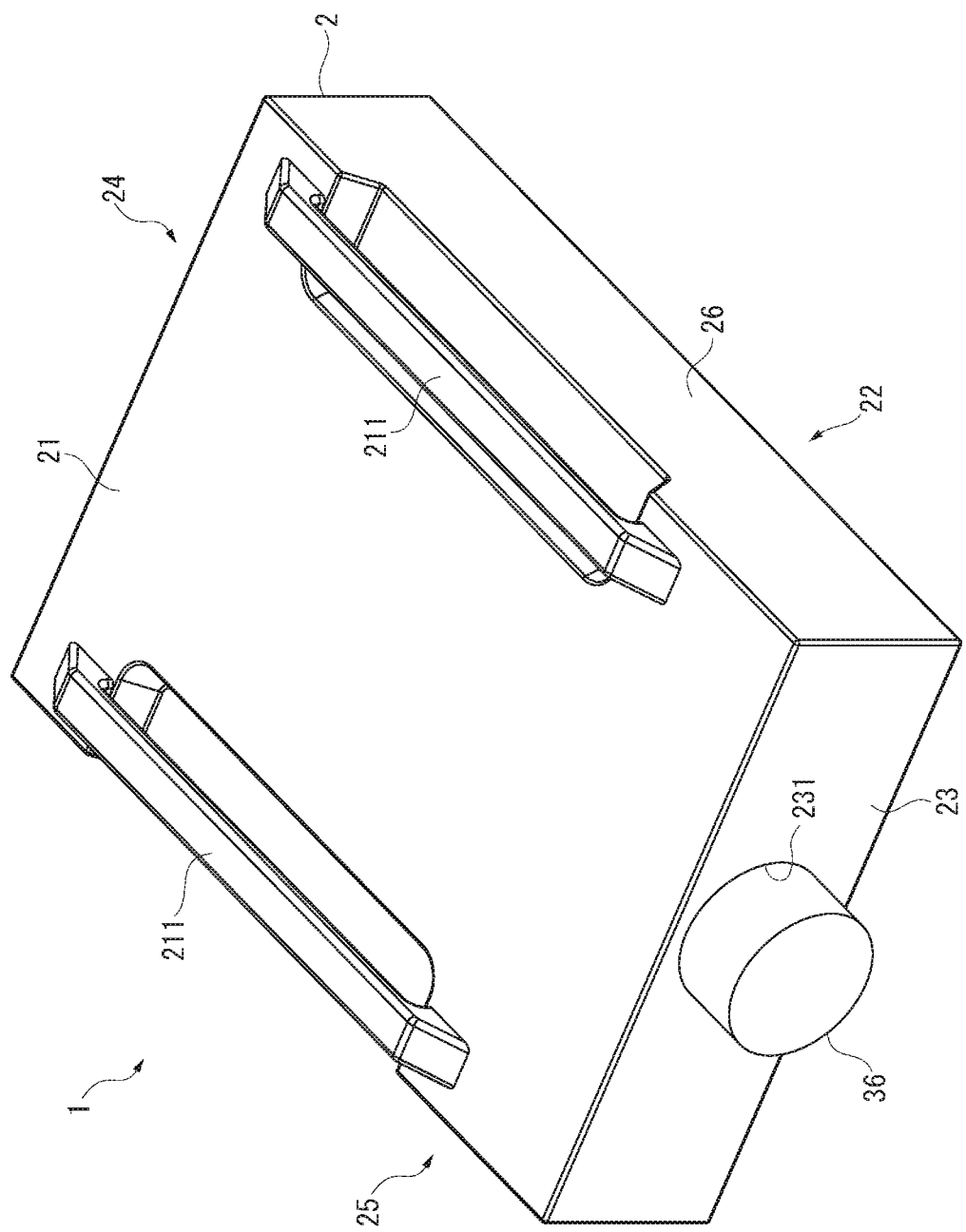
FIG. 1 is a schematic perspective view showing a projector according to a first embodiment of the present invention.

FIG. 1 is a schematic perspective view showing a projector 1 according to this embodiment.

The projector 1 according to this embodiment is a projection-type display device that modulates light emitted from an illumination device 31 explained below to form an image corresponding to image information and enlarges and projects the image on a projection surface such as a screen. This projector 1 includes, as shown in FIG. 1, an exterior housing 2 that configures an exterior.

As explained in detail below, this projector 1 includes a wavelength conversion device 5 that configures the illumination device 31. The wavelength conversion device 5 includes a wavelength conversion element 52, a circulating device 55, and a heat absorbing device 56 and a sealed-type housing 51 that houses these devices on the inside. As one of characteristics of the projector 1, the circulating device 55 circulates a cooling gas in the housing 51 to thereby cool a phosphor layer 522 included in the wavelength conversion element 52.

The configuration of the projector 1 is explained below.

[Configuration of the Exterior Housing]

The exterior housing 2 is formed in a substantially rectangular parallelepiped shape. The exterior housing 2 includes a top surface section 21, a bottom surface section 22, a front surface section 23, a back surface section 24, a left side surface section 25, and a right side surface section 26.

A pair of grip sections 211 is provided on the top surface section 21. Although not shown in the figure, leg sections in contact with a placing surface, on which the projector 1 is placed, are provided on the bottom surface section 22. An opening section 231, from which a part of a projection optical device 36 explained below is exposed, is formed in the front surface section 23. Further, although not shown in the figure, a lead-in port for leading in the air on the outside is formed in the right side surface section 26. An exhaust port for discharging the air circulating in the exterior housing 2 is formed in the left side surface section 25.

Figure 2:
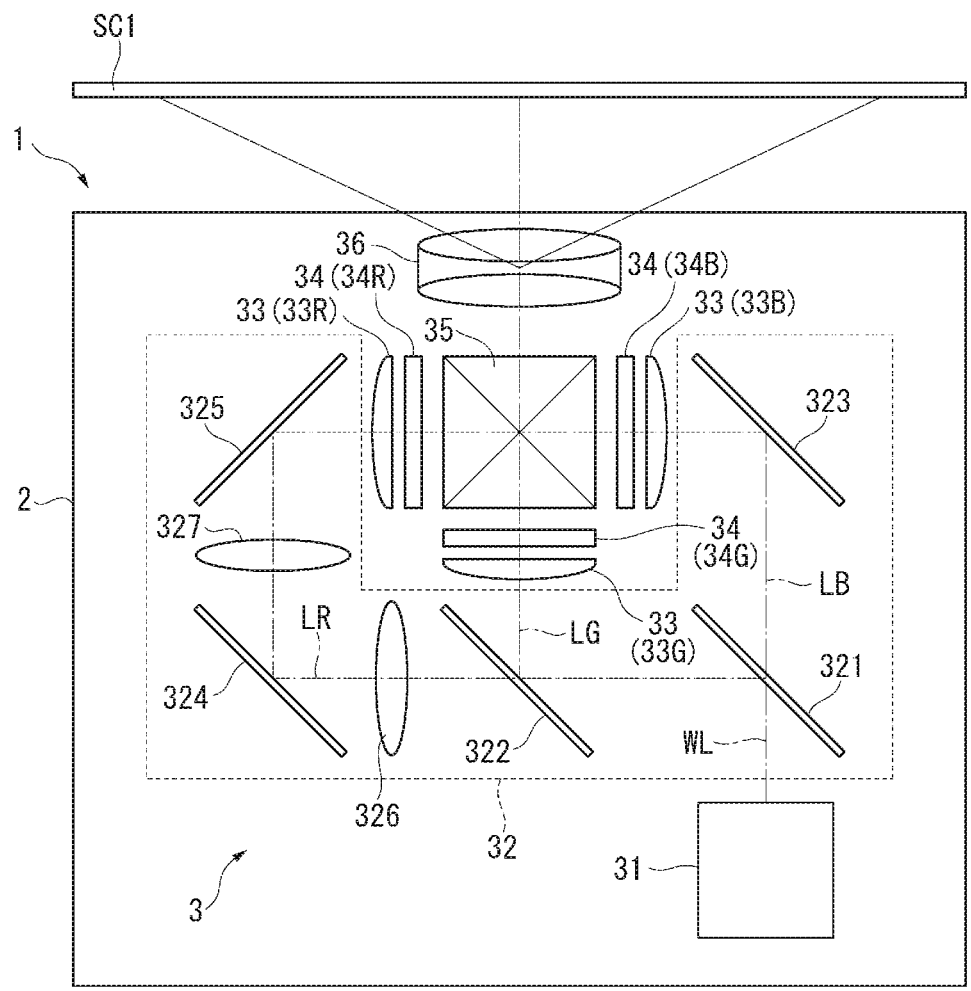
FIG. 2 is a schematic diagram showing the configuration of the projector in the first embodiment.

FIG. 2 is a schematic diagram showing the configuration of the projector 1 according to this embodiment.

The projector 1 includes, besides the exterior housing 2, as shown in FIG. 2, an optical unit 3, which is an image projection device housed in the exterior housing 2. Besides, although not shown in the figure, the projector 1 includes a control device that controls the projector 1, a cooling device that cools a cooling target such as an optical component, and a power supply device that supplies electric power to an electronic component.

[Configuration of an Optical Unit]

The optical unit 3 includes the illumination device 31, a color separation device 32, collimating lenses 33, image forming devices 34, a color combining device 35, and the projection optical device 36.

Among these devices, the illumination device 31 emits illumination light WL. Note that the configuration of the illumination device 31 is explained in detail below.

The color separation device 32 separates the illumination light WL made incident from the illumination device 31 into red, green, and blue color lights LR, LG, and LB. This color separation device 32 includes dichroic mirrors 321 and 322, reflection mirrors 323, 324, and 325, and relay lenses 326 and 327.

The dichroic mirror 321 separates the blue light LB and the other color lights (the green light LG and the red light LR) from the illumination light WL. The separated blue light LB is reflected by the reflection mirror 323 and led to the collimating lens 33 (33B). The separated other color lights are made incident on the dichroic mirror 322.

The dichroic mirror 322 separates the green light LG and the red light LR from the other color lights. The separated green light LG is led to the collimating lens 33 (33G). The separated red light LR is led to the collimating lens 33 (33R) via the relay lens 326, the reflection mirror 324, the relay lens 327, and the reflection mirror 325.

Note that the collimating lenses 33 (collimating lenses for the red, green, and blue color lights are respectively represented as 33R, 33G, and 33B) collimate incident lights.

The image forming devices 34 (image forming devices for the red, green, and blue color lights are respectively represented as 34R, 34G, and 34B) respectively modulate the incident color lights LR, LG, and LB and form image lights by the color lights LR, LG, and LB corresponding to image information. Each of these image forming devices 34 includes, for example, a liquid crystal panel functioning as a light modulating device that modulates incident light and a pair of polarizing plates disposed on an incident side and an emission side of the liquid crystal panel.

The color combining device 35 combines the color lights LR, LG, and LB made incident from the image forming devices 34R, 34G, and 34B to generate image light. In this embodiment, such a color combining device 35 is configured by a cross dichroic prism.

The projection optical device 36 enlarges and projects the image light formed by the color combining device 35 on a projection surface such as a screen SC1. As such a projection optical device 36, for example, a set lens configured by a lens barrel and a plurality of lenses disposed in the lens barrel can be adopted.

[Configuration of the Illuminating Device]

Figure 3:
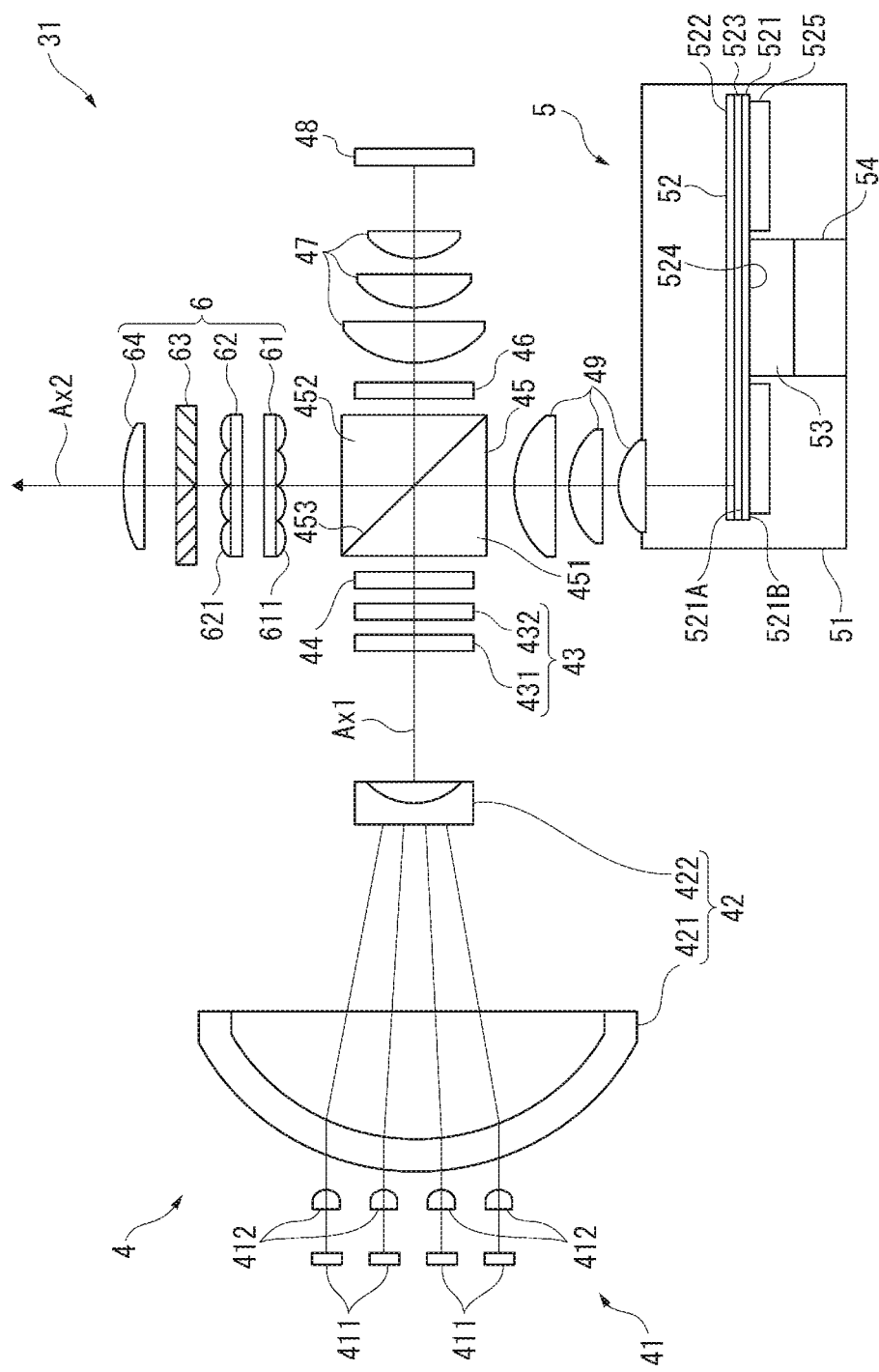
FIG. 3 is a schematic diagram showing the configuration of an illumination device in the first embodiment.

FIG. 3 is a schematic diagram showing the configuration of the illuminating device 31.

As explained above, the illuminating device 31 emits the illumination light WL toward the color separation device 32. The illuminating device 31 includes, as shown in FIG. 3, a light source device 4 and an equalizing device 6.

The light source device 4 includes a light source section 41, an afocal optical system 42, a homogenizer optical system 43, a first phase difference plate 44, a polarization separation device 45, a second phase difference plate 46, a first pickup lens 47, a diffusion reflection element 48, a second pickup lens 49, and the wavelength conversion device 5.

The light source section 41, the afocal optical system 42, the homogenizer optical system 43, the first phase difference plate 44, the polarization separation device 45, the second phase difference plate 46, the first pickup lens 47, and the diffusion reflection element 48 are disposed on an illumination optical axis Ax1. Note that the polarization separation device 45 is disposed in a crossing portion of the illumination optical axis Ax1 and an illumination optical axis Ax2 orthogonal to the illumination optical axis Ax1.

The light source section 41 includes a plurality of LDs (Laser Diodes) 411 and collimating lenses 412 corresponding to the LDs 411. The light source section 41 emits excitation light, which is blue light, toward the afocal optical system 42. Note that, in this embodiment, the LDs 411 emit, for example, excitation lights having a peak wavelength of 440 nm. However, LDs that emit excitation lights having a peak wavelength of 446 nm may be adopted. LDs that respectively emit excitation lights having peak wavelengths of 440 nm and 446 nm may be mixed. The excitation lights emitted from these LDs 411 are collimated by the collimating lenses 412 and made incident on the afocal optical system 42. Note that, in this embodiment, the excitation lights emitted from the LDs 411 are S polarized lights.

The afocal optical system 42 adjusts a light beam diameter of the excitation light made incident from the light source section 41. The afocal optical system 42 includes lenses 421 and 422. The excitation light passed through the afocal optical system 42 is made incident on the homogenizer optical system 43.

The homogenizer optical system 43 cooperates with the pickup lenses 47 and 49 explained below and equalizes an illuminance distribution of excitation light in an illuminated region of each of the diffusion reflection element 48 and the wavelength conversion device 5. The homogenizer optical system 43 includes a pair of multi-lens arrays 431 and 432, in each of which a plurality of small lenses are arrayed in a matrix shape on an optical axis orthogonal surface. The excitation light emitted from the homogenizer optical system 43 is made incident on the first phase difference plate 44.

The first phase difference plate 44 is a half wavelength plate. The first phase difference plate 44 converts a part of S polarized light into P polarized light in a process of transmitting incident excitation light. Consequently, the excitation light made incident on the first phase difference plate 44 is emitted as light in which the S polarized light and the P polarized light are mixed. The excitation light converted in this way is made incident on the polarization separation device 45.

The polarization separation device 45 is a PBS (Polarizing Beam Splitter) of a prism type. Prisms 451 and 452 each formed in a substantially triangular shape are stuck together on an interface corresponding to an oblique side to thereby be formed in a substantially rectangular parallelepiped shape. This interface inclines approximately 45° with respect to each of the illumination optical axis Ax1 and the illumination optical axis Ax2. In the polarization separation device 45, a polarization separation layer 453 is formed on an interface of the prism 451 located on the first phase difference plate side (i.e., the light source section 41 side) in the polarization separation device 45.

The polarization separation layer 453 has a wavelength-selective polarization separation characteristic. Specifically, the polarization separation layer 453 has a characteristic of reflecting one of the S polarized light and the P polarized light included in the excitation light, transmitting the other, and separating these polarized lights. The polarization separation layer 453 has a characteristic of transmitting fluorescent light generated in the wavelength conversion device 5 irrespective of a polarization state.

In the excitation light made incident from the first phase difference plate 44, the P polarized light is transmitted to the second phase difference plate 46 side along the illumination optical system Ax1 and the S polarized light is reflected to the second pickup lens 49 side along the illumination optical system Ax2 by such a polarization separation device 45.

The second phase difference plate 46 is a quarter wavelength plate. The second phase difference plate 46 rotates a polarization direction of incident light in a process of transmitting the incident light. Therefore, the P polarized light made incident from the polarization separation device 45 is made incident on the first pickup lens 47 in a state in which the polarization direction is rotated.

The first pickup lens 47 causes the diffusion reflection element 48 to condense the excitation light transmitted through the second phase difference plate 46 and made incident on the first pickup lens 47. Note that, in this embodiment, the number of lenses configuring the first pickup lens 47 is three. However, the number of the lenses is not limited to this and may be any number.

The diffusion reflection element 48 diffuses and reflects incident excitation light in the same manner as fluorescent light generated and reflected by the wavelength conversion device 5 explained below. As the diffusion reflection element 48, a reflecting member that causes Lambert reflection of an incident light beam can be illustrated.

The excitation light diffused and reflected by such a diffusion reflection element 48 is made incident on the second phase difference plate 46 again via the first pickup lens 47. A polarization direction of the excited light is further rotated in a process of transmitting the excitation light through the second phase difference plate 46. The excitation light is converted into the S polarized light. The excitation light is reflected by the polarization separation layer 453 of the polarization separation device 45 and made incident on the equalizing device 6.

The second pickup lens 49 and the wavelength conversion device 5 are disposed on the illumination optical axis Ax2.

An S polarized light component of the excitation light is made incident on the second pickup lens 49 from the first phase difference plate 44 via the polarization separation layer 453. The second pickup lens 49 condenses the excitation light on the wavelength conversion device 5. Note that, in this embodiment, the number of lenses configuring the second pickup lens 49 is three as in the first pickup lens 47. However, the number of the lenses is not limited to this and may be any number.

The wavelength conversion device 5 generates fluorescent light with the incident excitation light. The fluorescent light generated by such a wavelength conversion element 52 is made incident on the polarization separation layer 453 of the polarization separation device 45 via the second pickup lens 49. This fluorescent light is non-polarized light. However, the polarization separation layer 453 has the wavelength-selective polarization separation characteristic as explained above. Therefore, the fluorescent light is transmitted through the polarization separation layer 453 and made incident on the equalizing device 6. Note that the configuration of the wavelength conversion device 5 is explained in detail below.

In this way, the P polarized light of the excitation light emitted from the light source section 41 and made incident on the polarization separation device 45 is made incident on the diffusion reflection element 48 to thereby be diffused. The P polarized light is converted into S polarized light in a process of transmitting the P polarized light through the second phase difference plate 46 twice and is reflected to the equalizing device 6 side by the polarization separating device 45.

On the other hand, the S polarized light in the excitation light is wavelength-converted into fluorescent light by the wavelength conversion device 5 and thereafter emitted to the equalizing device 6 side via the polarization separation device 45.

That is, the blue light, which is a part of the exaction light, and the fluorescent light (light including the green light and the red light) are combined by the polarization separating device 45 and made incident on the equalizing device 6 as white illumination light WL.

[Configuration of the Equalizing Device]

The equalizing device 6 shown in FIG. 3 equalizes the illuminances in optical axis orthogonal planes of light beams made incident on the image forming devices 34 (34R, 34G, and 34B), which are illuminated regions. Besides, the equalizing device 6 has a function of aligning polarization directions. This equalizing device 6 includes a first lens array 61, a second lens array 62, a polarization conversion element 63, and a superimposition lens 64.

The first lens array 61 has a configuration in which first lenses 611 are arrayed in a matrix shape in an optical axis orthogonal plane. The first lens array 61 divides an incident light beam (illumination light WL) into a plurality of partial light beams.

The second lens array 62 has a configuration in which second lenses 621 corresponding to the first lenses 611 are arrayed in a matrix shape in an optical axis orthogonal plane. The second lenses 621 cause the image forming devices 34 to superimpose the plurality of partial light beams divided by the first lenses 611 in conjunction with the superimposition lens 64.

The polarization conversion element 63 is disposed between the second lens array 62 and the superimposition lens 64. The polarization conversion element 63 aligns polarization directions of the plurality of partial light beams. The illumination light WL formed by the plurality of partial light beams, the polarization directions of which are aligned by the polarization conversion element 63, is made incident on the color separation device 32 via the superimposition lens 64.

[Configuration of the Wavelength Conversion Device]

Figure 4:
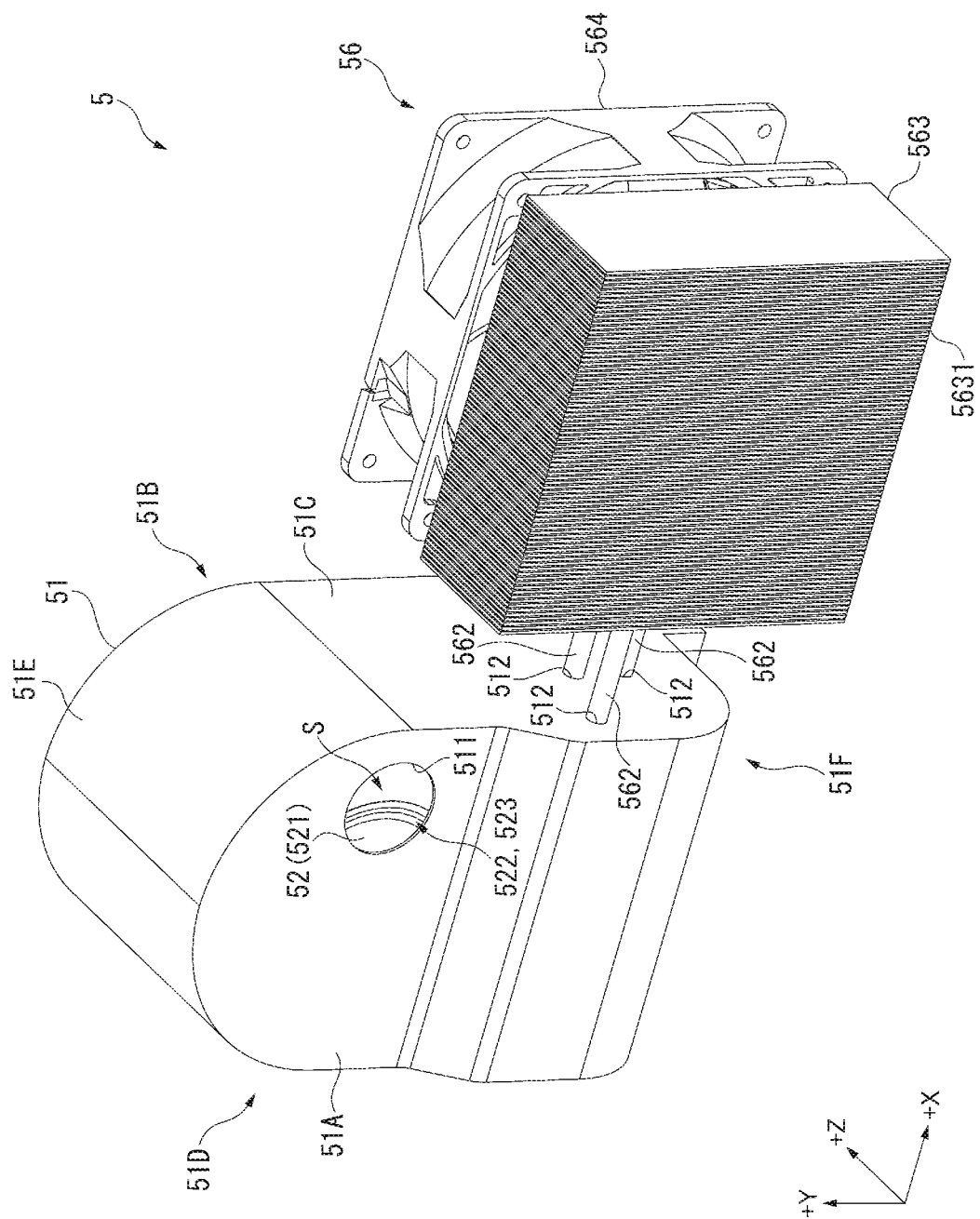
FIG. 4 is a perspective view showing an exterior of a wavelength conversion device in the first embodiment.
Figure 5:
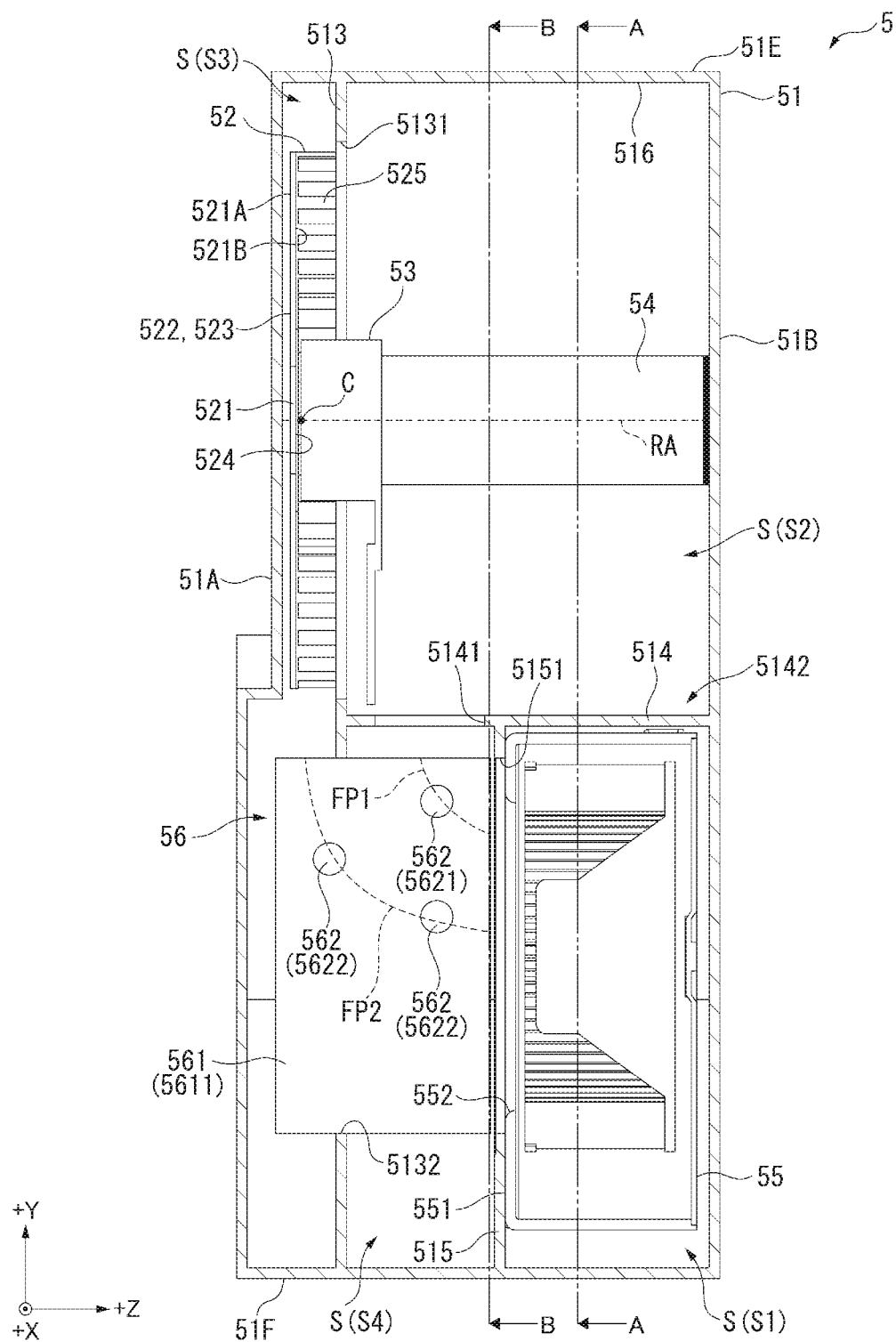
FIG. 5 is a sectional view showing the wavelength conversion device in the first embodiment.
Figure 6:
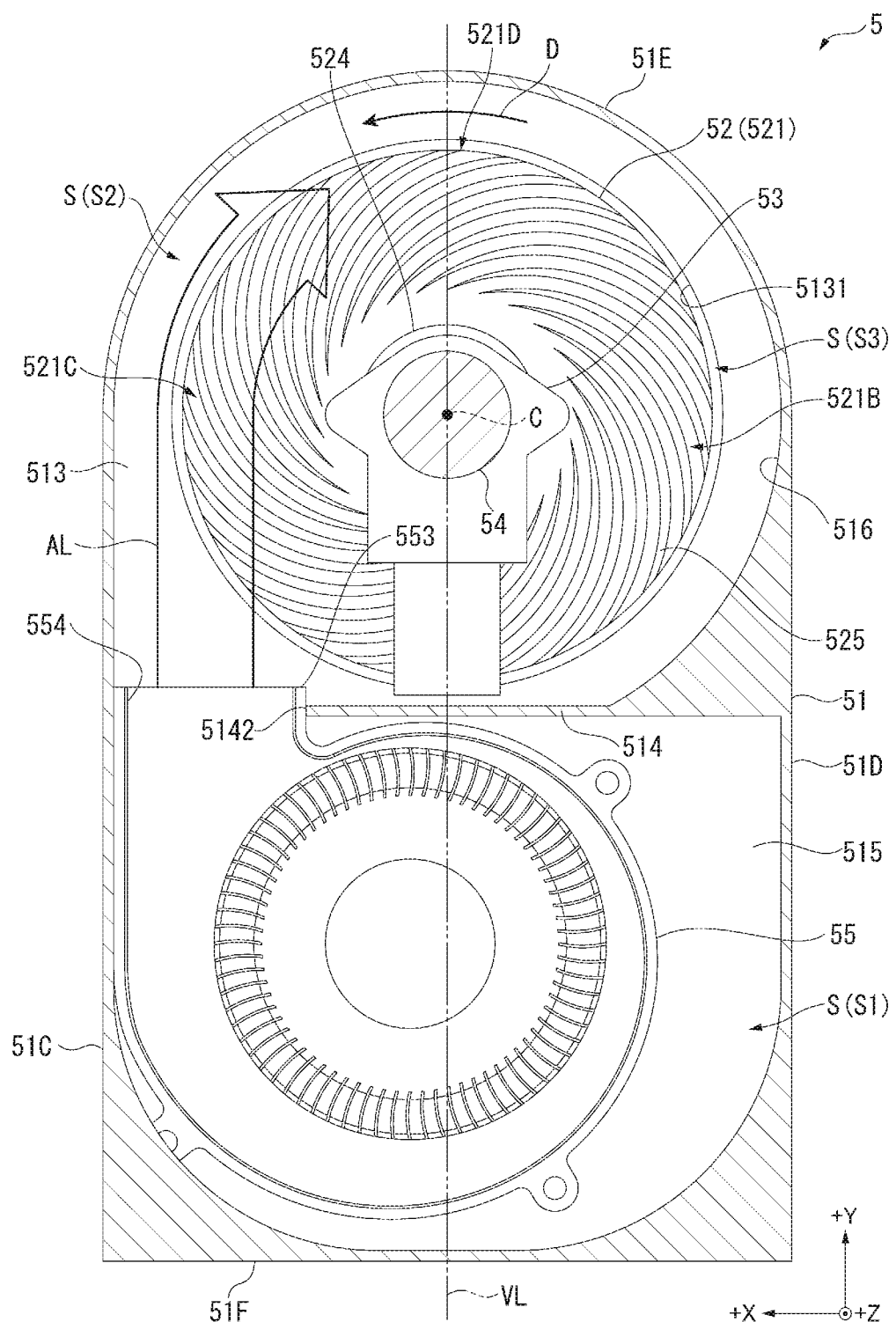
FIG. 6 is a sectional view taken along an A-A line of the wavelength conversion device shown in FIG. 5.
Figure 7:
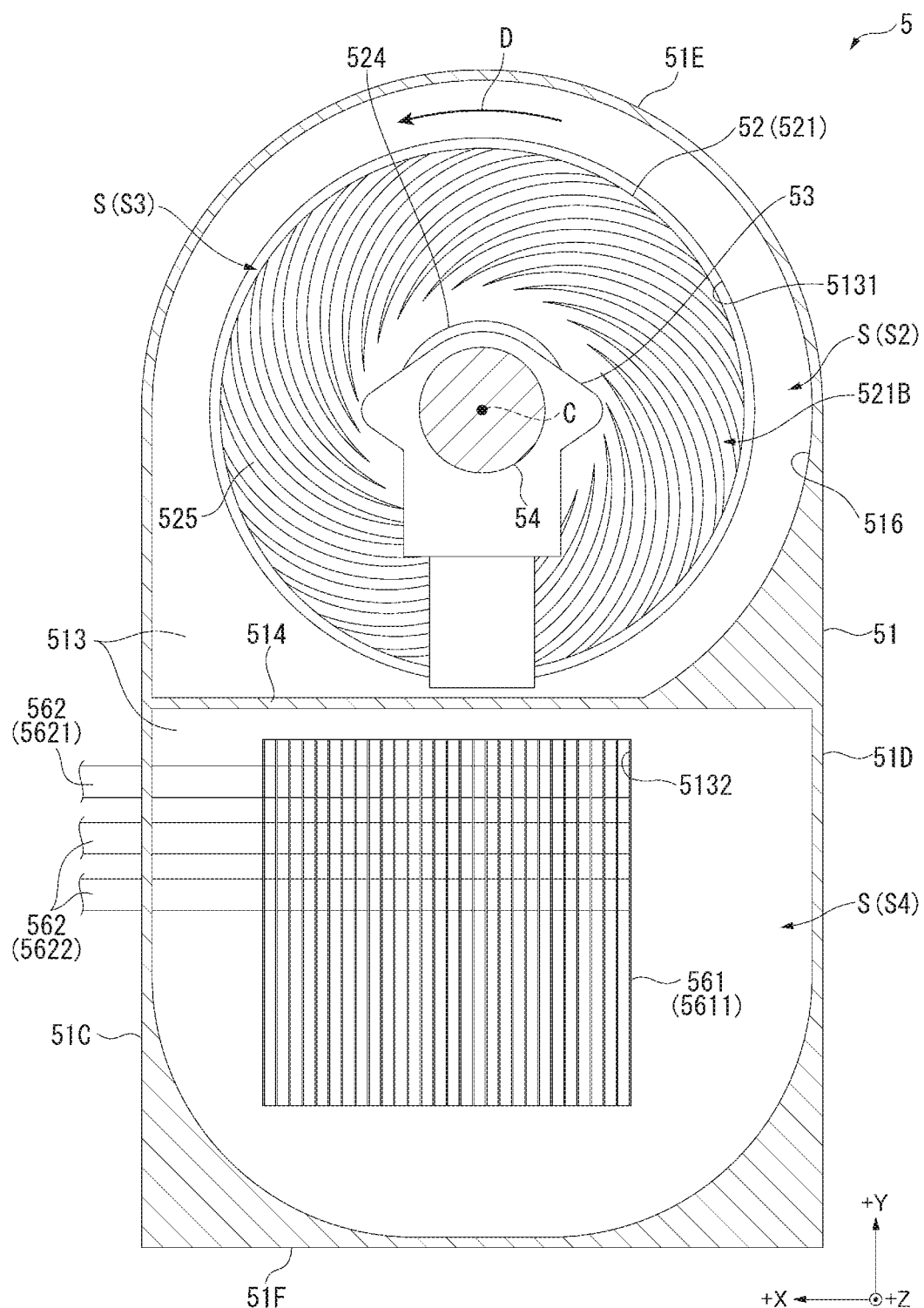
FIG. 7 is a sectional view taken along a B-B line of the wavelength conversion device shown in FIG. 5.

FIG. 4 is a perspective view showing the exterior of the wavelength conversion device 5. FIG. 5 is a sectional view showing the wavelength conversion device 5. Further, FIG. 6 is a sectional view taken along an A-A line of the wavelength conversion device 5 in FIG. 5. FIG. 7 is a sectional view taken along a B-B line of the wavelength conversion device 5 in FIG. 5.

As shown in FIG. 3 to FIG. 7, the wavelength conversion device 5 includes the housing 51. Besides, as shown in FIG. 4 to FIG. 7, the wavelength conversion device 5 includes the wavelength conversion element 52, a rotating device 53, an attachment member 54, and the circulating device 55 each disposed inside the housing 51 and the heat absorbing device 56, a part of components of which are disposed inside the housing 51 and the other components of which are disposed outside the housing 51.

Among these devices, the heat absorbing device 56 includes a heat receiver 561 (FIG. 5 and FIG. 7) and includes a plurality of heat pipes 562, a radiator 563, and a cooling fan 564 as shown in FIG. 4. The configuration of such a heat absorbing device 56 is explained in detail below.

Note that, in the following explanation, a traveling direction of the excitation light with respect to the wavelength conversion device 5 is represented as a +Z direction. Directions respectively orthogonal to the +Z direction and orthogonal to each other are represented as a +X direction and a +Y direction. Among these directions, the +X direction is set as a direction in which the radiator 563 is located with respect to the housing 51. The +Y direction is set as a direction orthogonal to each of the +Z direction and the +X direction and directed toward the wavelength conversion element 52 from the circulating device 55 and the heat receiver 561 when viewed from the +Z direction side. For convenience of explanation, the opposite direction of the +Z direction is represented as a −Z direction. The same applies to a −X direction and a −Y direction.

[External Configuration of the Housing]

The housing 51 is a sealed housing, on the inside of which a housing space S for housing the wavelength conversion element 52, the rotating device 53, the attachment member 54, the circulating device 55, and the heat receiver 561 configuring the heat absorbing device 56 are housed. As shown in FIG. 4, the housing 51 is formed in a semicircular shape on the +Y direction side and formed in a substantially rectangular shape on the −Y direction side when viewed from the −Z direction side.

Such a housing 51 includes a side surface section 51A located on the −Z direction side, a side surface section 51B located on the +Z direction side, a side surface section 51C located on the +X direction side, a side surface section 51D located on the −X direction side, a side surface section 51E located on the +Y direction side, and a side surface section 51F located on the −Y direction side.

The side surface section 51A is a side surface section on a light incident side in the housing 51. In the side surface section 51A, an opening section 511, in which a lens closest to the wavelength conversion element 52 among the plurality of lenses configuring the second pickup lens 49 is fit, is formed.

In the side surface section 51C, a plurality of holes 512, through which the heat pipes 562 configuring the heat absorbing device 56 explained below are inserted, are formed.

The side surface section 51E is a portion formed in an arcuate shape when viewed from the −Z direction side.

[Internal Configuration of the Housing]

As shown in FIG. 5, the housing 51 includes, on the inside, a first partition wall 513, a second partition wall 514, and a third partition wall 515 that segment the housing space S to form spaces S1 to S4.

The first partition wall 513 is formed along an XY plane in a position apart from the side surface section 51A by a predetermined space on the inside of the housing 51 to be connected to the inner surfaces of the side surface sections 51C to 51F. In the space S3 (a second space) surrounded by the first partition wall 513 and the inner surfaces of the side surface sections 51A and 51C to 51F, the wavelength conversion element 52 and a part on the −Z direction side in the rotating device 53 are disposed in positions on the +Y direction side. A part on the −Z direction side in the heat receiver 561 is disposed in a position on the −Y direction side.

An opening section 5131 is formed in a position corresponding to the wavelength conversion element 52 in the first partition wall 513. As shown in FIG. 6 and FIG. 7, an opening shape of the opening section 5131 substantially coincides with a rotation range of a substrate 521. That is, the opening section 5131 is formed in a substantially circular shape corresponding to an external shape during rotation of the substrate 521. An inner diameter dimension of the opening section 5131 substantially coincides with a diameter dimension during rotation of the wavelength conversion element 52 (the substrate 521). A center position of the opening section 5131 and a center position of the wavelength conversion element 52 (the substrate 521) substantially coincide.

In a part on the −Y direction side in the first partition wall 513, as shown in FIG. 7, an opening section 5132 having a substantially rectangular shape substantially coinciding with the external shape of the heat receiver 561 is formed. An opening area of this opening section 5132 substantially coincides with the sectional area of the heat receiver 561. The heat receiver 561 is fit in the opening section 5132.

As shown in FIG. 5, the second partition wall 514 is formed along an XZ plane on the +Z direction side with respect to the first partition wall 513 and in a substantially center position in the +Y direction of the housing 51. That is, the second partition wall 514 is connected to the first partition wall 513 to be substantially orthogonal to the first partition wall 513. Besides, the second partition wall 514 is connected to the inner surfaces of the side surface sections 51B to 51D. A part on the +Z direction side in the rotating device 53 and the attachment member 54 are disposed in the space S2 (a first space) surrounded by this second partition wall 514, the first partition wall 513, and the inner surfaces of the side surface sections 51B to 51E. Besides, as shown in FIG. 6, a part in the +Y direction side in the circulating device 55 is disposed in the space S2.

Note that, on the inner side of the side surface sections 51C to 51E, as shown in FIG. 6 and FIG. 7, an arcuate section 516 formed in a substantially circular shape centering on a center C of the wavelength conversion element 52 (the center C of the substantially circular substrate 521) when viewed from the +Z direction side is formed on the outer side of the wavelength conversion element 52. The space S2 is formed by the arcuate section 516, the surface on the +Y direction side in the second partition wall 514, and the inner surface of the side surface section 51B. Therefore, the space S2 is a substantially circular space when viewed from the +Z direction side.

As shown in FIG. 5, the third partition wall 515 segments a space on the −Y direction side with respect to the second partition wall 514 into the space S1 on the +Z direction side and the space S4 on the −Z direction side. This third partition wall 515 is formed along the XY plane in a position on the −Y direction side with respect to the second partition wall 514 and between the first partition wall 513 and the inner surface of the side surface section 51B. That is, the third partition wall 515 is formed in parallel to the first partition wall 513 and connected to the second partition wall 514 and the inner surfaces of the side surface sections 51C, 51D, and 51F. In the space S4 surrounded by the third partition wall 515, the first partition wall 513 and the second partition wall 514, and the inner surfaces of the side surface sections 51C, 51D, and 51F, as shown in FIG. 5 and FIG. 7, a part on the +Z direction side in the heat receiver 561 is disposed. In the space S1 surrounded by the third partition wall 515, the second partition wall 514, and the inner surfaces of the side surface sections 51B to 51D and 51F, as shown in FIG. 5 and FIG. 6, a part on the −Y direction side in the circulating device 55 is disposed.

Note that, as shown in FIG. 5, in a position corresponding to the heat receiver 561 in the second partition wall 514, an opening section 5141 for causing the spaces S2 and S4 to communicate is formed.

In a position corresponding to the heat receiver 561 and an intake port 552 of the circulating device 55 substantially in the center of the third partition wall 515, an opening section 5151 for causing the space S4 and the space S1 to communicate is formed.

Further, as shown in FIG. 5 and FIG. 6, in a position further on the +Z direction side than the opening section 5141 and in a position on the +X direction side in the second partition wall 514, an opening section 5142 in which a discharge section 553 of the circulating device 55 is disposed is formed.

[Configuration of the Wavelength Conversion Element]

The wavelength conversion element 52 generates and emits the fluorescent light according to incidence of excitation light. As shown in FIG. 5, this wavelength conversion element 52 is disposed in the space S3 such that a predetermined gap is formed between the wavelength conversion element 52 and the inner surface of the side surface section 51A.

Such a wavelength conversion element 52 includes, as shown in FIG. 3 and FIG. 5, the substrate 521 rotated by the rotating device 53 explained below. The substrate 521 includes the phosphor layer (a wavelength conversion layer) 522, a reflection layer 523, a connecting section 524, and a plurality of fins 525.

Among these components, as shown in FIG. 6 and FIG. 7, the substrate 521 is formed in a substantially circular shape when viewed from the +Z direction side. This substrate 521 is formed by a member having thermal conductivity. In this embodiment, the substrate 521 is formed by metal.

As shown in FIG. 3 and FIG. 5, the phosphor layer 522 and the reflection layer 523 are each located on a surface 521A on an incident side of excitation light (the −Z direction side) on the substrate 521.

The phosphor layer 522 includes a phosphor excited by incident excitation light to emit fluorescent light (light in a wavelength region of 500 to 700 nm). When excitation light is made incident on this phosphor layer 522, a part of the fluorescent light is emitted to the second pickup lens 49 side and another part is emitted to the reflection layer 523 side.

The reflection surface 523 is disposed between the phosphor layer 522 and the substrate 521. The reflection surface 523 reflects the fluorescent light made incident from the phosphor layer 522 to the second pickup lens 49 side.

As shown in FIG. 5 to FIG. 7, the connecting section 524 and the plurality of fins 525 are located on a surface 521B on the opposite side of the surface 521A (the +Z direction side).

The connecting section 524 is a part located in the center of the surface 521B, the rotating device 53 being connected to the part.

The plurality of fins 525 are formed around the connecting section 524. In detail, the plurality of fins 525 are each formed in a region on the outer side of the connecting section 524 on the surface 521B to extend from a position on the center side toward the outer side. These fins 525 are not linearly formed from the center of the substrate 521 toward the outer side. The fins 525 are formed in an arcuate shape curved to warp to the opposite side of a rotating direction of the substrate 521 (a D direction) by the rotating device 53 toward the outer side. That is, the fins 525 do not radially extend. The fins 525 are formed in a spiral shape swirling to the opposite side of the D direction in a degree not circulating a half circumference of the substrate 521. Heat generated in the fluorescent layer 522 is conducted to the fins 525 via the substrate 521. Heat exchange is performed between the fins 525 and a cooling gas circulated by the circulating device 55 explained below. Consequently, the fins 525 and the phosphor layer 522 are cooled.

[Configuration of the Rotating Device]

The rotating device 53 is configured by, for example, a motor that rotates the rotating device 53 around a rotation axis RA passing the center C of the wavelength conversion element 52 and extending along the +Z direction as shown in FIG. 5 to FIG. 7. This rotating device 53 is located on the +Z direction side with respect to the wavelength conversion element 52 and connected to the connecting section 524. As shown in FIG. 6 and FIG. 7, the rotating device 53 rotates the wavelength conversion element 52 in the D direction, which is a counterclockwise direction when viewed from the +Z direction side. A position where the excitation light is made incident in the phosphor layer 522 is changed according to the rotation of this wavelength conversion element 52, whereby a part where heat is generated in the phosphor layer 522 is diffused. High heat is prevented from being locally generated in the phosphor layer 522. Besides, heat exchange with a cooling gas is facilitated.

[Configuration of the Attachment Member]

One end of the attachment member 54 is connected to the rotating device 53 and the other end of the attachment member 54 is fixed to the inner surface of the side surface section 51B on the +Z direction side in the housing 51, whereby the rotating device 53 is attached inside the housing 51. As shown in FIG. 6 and FIG. 7, this attachment member 54 is formed in a cylindrical shape having a center axis extending along the +Z direction not to prevent circulation of a cooling gas discharged by the circulating device 55 explained below. Besides, the attachment member 54 is disposed to be located on the inner side of the fins 525 when viewed from the +Z direction side. Note that the attachment member 54 may be formed in a prism shape. In this case, in terms of not preventing the circulation of the cooling gas, the cross section of the attachment member 54 is desirably a polygonal shape having a larger number of corner sections.

[Configuration of the Circulating Device]

The circulating device 55 circulates a cooling gas in the housing 51 and circulates the cooling gas to the wavelength conversion element 52 (in detail, the plurality of fins 525). This circulating device 55 is located on the −Y direction side with respect to the wavelength conversion element 52 when viewed from the +Z direction side. In this embodiment, the circulating device 55 is configured by a sirocco fan.

As shown in FIG. 5 and FIG. 6, the circulating device 55 is disposed over the spaces S1 and S2. Specifically, the circulating device 55 is disposed to be opposed to the third partition wall 515 such that the intake port 552 located on a surface 551 set in contact with the third partition wall 515 to suck a cooling gas is in a position corresponding to the opening section 5151 of the third partition wall 515. In the circulating device 55, the discharge section 553 including the discharge port 554 for discharging the cooling gas is located inside the space S2 as shown in FIG. 6.

With such a circulating device 55, a cooling gas sucked from the space S4, in which the heat receiver 561 explained below is located, is discharged from the discharge port 554 located inside the space S2, circulates inside the space S2, and is circulated to the surface 521B of the wavelength conversion element 52 via the opening section 5131.

As shown in FIG. 6, the discharge section 553 (the discharge port 554) is disposed to be shifted in the +X direction with respect to an imaginary line VL passing the center C of the wavelength conversion element 52 and extending along the +Y direction to cross the arcuate section 516. Therefore, when viewed from the +Z direction side, as indicated by an arrow AL, a cooling gas is delivered from the discharge port 554 while deviating to the +X direction side with respect to the wavelength conversion element 52 and thereafter circulates clockwise along the arcuate section 516 and the surface 521B of the wavelength conversion element 52. That is, a circulating direction of the cooling air circulating along the surface 521B is the opposite direction of the rotating direction of the substrate 521. The cooling gas is taken into the plurality of fins 525, cools the plurality of fins 525, and is thereafter radially discharged into the space S3 according to the rotation of the substrate 521.

Note that a cooling gas that has cooled the wavelength conversion element 52 circulates to the −Y direction side in the space S3 with a suction force of the circulating device 55 and circulates inside the heat receiver 561 configuring the heat absorbing device 56.

[Configuration of the Heat Absorbing Device]

The heat absorbing device 56 absorbs heat from a cooling gas that circulates inside the housing 51 with the circulating device 55, discharges the absorbed heat to the outside of the housing 51, and reduces the temperature inside the housing 51. This heat absorbing device 56 includes, as shown in FIG. 5 and FIG. 7, the heat receiver 561 (FIG. 6 and FIG. 7) and the plurality of heat pipes 562. Besides, the heat absorbing device 56 includes, as shown in FIG. 4, the radiator 563 and the cooling fan 564 each disposed on the outside of the housing 51.

The heat receiver 561 receives (absorbs) heat of a cooling gas. As explained above, the heat receiver 561 is disposed to extend over the spaces S3 and S4 inside the housing 51. In detail, as shown in FIG. 5, a part on the −Z direction side of the heat receiver 561 is fit in the opening section 5132. An end portion on the +Z direction side of the heat receiver 561 is in contact with a surface on the −Z direction side in the third partition wall 515. In this way, substantially all of the cooling gases sucked by the circulating device 55 are cooling gases that circulate inside the heat receiver 561.

As shown in FIG. 7, such a heat receiver 561 is configured by a plurality of tabular fins 5611 extending along a Y direction (in detail, a YZ plane). These fins 5611 are disposed in parallel along the +X direction at a predetermined gap. Channels, in which a cooling gas flows, are formed among the fins 5611. The heat receiver 561 receives heat from the cooling gas and cools the cooling gas.

A part on the +Y direction side in the heat receiver 561 is in contact with an end edge on the +Y direction side among end edges of the opening section 5132 of the first partition wall 513. The second partition wall 514 located on the +Y direction side with respect to the heat receiver 561 and substantially orthogonal to the first partition wall 513 includes the opening section 5141 in a position corresponding to the heat receiver 561. Therefore, with the suction force of the circulating device 55, a part of a cooling gas inside the space S2 flows into the heat receiver 561. Besides, a cooling gas that has cooled the wavelength conversion element 52 flows into the heat receiver 561 from the space S3. These cooling gases are sucked by the circulating device 55. That is, the heat receiver 561 includes a first channel FP1 into which a part of the cooling gas inside the space S2 flows and in which the cooling gas circulates to the circulating device 55 side and a second channel FP2 into which the cooling gas that has cooled the wavelength conversion element 52 flows from the space S3 and in which the cooling gas circulates to the circulating device 55 side.

Note that a channel length of the second channel FP2 is larger than a channel length of the first channel FP1. Therefore, it is possible to secure a channel length capable of sufficiently receiving heat from a cooling gas having a relatively high temperature circulating in the second channel FP2.

The plurality of heat pipes 562 (5621 and 5622) are heat conduction members that conduct heat conducted to the heat receiver 561 to the radiator 563. As shown in FIG. 5 and FIG. 7, one ends of these heat pipes 562 are connected the heat receiver 561 inside the housing 51. As shown in FIG. 4, the other ends of the heat pipes 562 are connected to the radiator 563 on the outside of the housing 51. In this embodiment, three heat pipes 562 are provided. However, the number of the heat pipes 562 can be changed as appropriate.

The temperature of the cooling gas circulating in the second channel FP2 is higher than the temperature of the cooling gas circulating in the first channel FP1. Therefore, a heat quantity conducted to the second channel FP2 is higher than a heat quantity conducted to the first channel FP1. Consequently, it is necessary to efficiently conduct heat conducted from the first channel FP1 to the second channel FP2 to the outside of the housing 51.

On the other hand, in this embodiment, a contact area of the heat pipes 562 provided in the second channel FP2 (the heat pipes 562 that conduct heat conducted in the second channel FP2 to the outside of the housing 51) with the heat receiver 561 is set larger than a contact area of the heat pipes 562 provided in the first channel FP1 (the heat pipes 562 that conduct heat conducted in the first channel FP1 to the outside of the housing 51) with the heat receiver 561.

Specifically, the number of the heat pipes 5622 provided in the second channel FP2 is larger than the number of the heat pipes 5621 provided in the first channel FP1. In detail, whereas one heat pipe 5621 is provided in the first channel FP1, two heat pipes 5622 are provided in the second channel FP2. Consequently, it is possible to efficiently conduct heat conducted to the first channel FP1 and the second channel PF2 to the outside of the housing 51 with a small number of the heat pipes 562.

As shown in FIG. 4, the radiator 563 radiates heat of the heat receiver 561 conducted via the heat pipes 562 to the outside of the housing 51. This radiator 563 includes a plurality of fins 5631 formed by metal having thermal conductivity. The other ends of the heat pipes 562 are disposed to pierce through these fins 5631.

The cooling fan 564 circulates a cooling gas (the external air led into the exterior housing 2) to the radiator 563 and discharges heat conducted to the radiator 563. In this embodiment, the cooling fan 564 is configured by an axial flow fan. When this cooling fan 564 is driven, the cooling gas is sucked, whereby the cooling gas is supplied to the radiator 563 and the radiator 563 is cooled. Such a cooling gas served for the cooling of the radiator 563 is sucked and discharged by the cooling fan 564. The cooling gas is discharged to the outside of the exterior housing 2 by a not-shown fan via an exhaust port formed in the exterior housing 2. Note that the cooling fan 564 may be configured by a sirocco fan.

[Circulation Channel of a Cooling Gas in the Housing]

Figure 8:
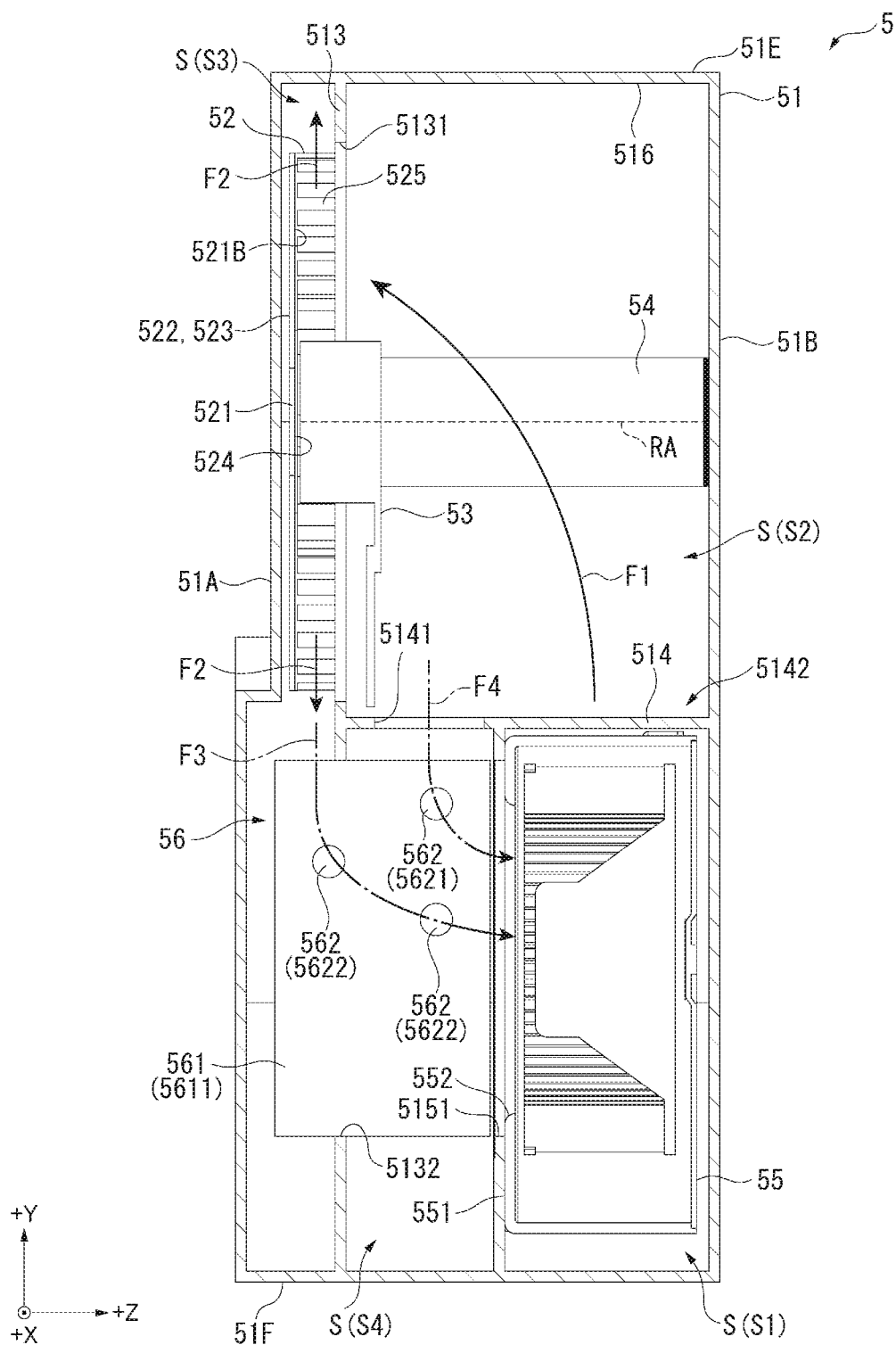
FIG. 8 is a schematic diagram showing a flow of a cooling gas in a housing in the first embodiment.

FIG. 8 is a schematic diagram showing a circulation channel of a cooling gas inside the housing 51.

As explained above, the cooling gas inside the housing 51 is circulated by the circulating device 55.

Specifically, as indicated by an arrow F1 in FIG. 8, the cooling gas discharged into the space S2 from the circulating device 55 located inside the space S1 circulates to, via the opening section 5131 of the first partition wall 513, the surface 521B on the +Z direction side in the wavelength conversion element 52 located inside the space S3.

The cooling gas circulating to the wavelength conversion element 52 intrudes into among the plurality of fins 525 located on the surface 521B. At this time, heat of the phosphor layer 522 conducted to the fins 525 is conducted to the cooling gas. The fins 525 and the phosphor layer 522 are cooled.

As indicated by an arrow F2, a cooling gas that has cooled the wavelength conversion element 52 is emitted into the space S3 from among the fins 525 radially centering on the center C when viewed from the +Z direction side according to the rotation of the wavelength conversion element 52 by the rotating device 53.

The cooling gas emitted into the space S3 from the wavelength conversion element 52 is prevented from circulating to the space S2 side by the first partition wall 513. On the other hand, the cooling gas circulates to the −Y direction side inside the space S3 with the suction force of the circulating device 55 and is caused to flow into the heat receiver 561. This cooling gas circulates in the second channel FP2 along an arrow F3 and is caused to flow into the circulating device 55 via the opening section 5151 for causing the space S4 and the space S1 to communicate.

With the suction force of the circulating device 55, a part of a cooling gas inside the space S2 is caused to flow into the heat receiver 561 located in the space S4 via the opening section 5141 of the second partition wall 514 along an arrow F4. The part of the cooling gas circulates in the first channel FP1 and is caused to flow into the circulating device 55 via the opening section 5151. Consequently, it is possible to lower the temperature of the cooling gas discharged from the circulating device 55 and circulating to the wavelength conversion element 52.

Note that, as explained above, the heat conducted to the heat receiver 561 is conducted to the radiator 563 via the heat pipes 562 and emitted to the outside of the housing 51.

Effects of the First Embodiment

With the projector 1 according to this embodiment explained above, there are effects explained below.

The housing 51, in which the wavelength conversion element 52 including the substrate 521 and the circulating device 55 are housed, includes the first partition wall 513 that separates the space S2 (the first space) on the delivery side of a cooling gas to the substrate 521 and the space S3 (the second space) to which the cooling gas is discharged from the substrate 521.

Consequently, it is possible to prevent a cooling gas radially discharged from the substrate 521, that is, a cooling gas that has cooled the substrate 521 from circulating to the space S2 side while keeping heat and being circulated to the substrate 521 again. Therefore, it is possible to prevent a cooling gas having a high temperature from being supplied to the substrate 521. Therefore, it is possible to efficiently cool the substrate 521 on which the phosphor layer 522 is located and the phosphor of the phosphor layer 522.

Since a cooling gas circulating toward the substrate 521 and a cooling gas discharged from the substrate 521 can be divided by the first partition wall 513, it is possible to prevent these cooling gases from colliding with each other. Therefore, it is possible to surely circulate the individual cooling gases.

The first partition wall 513 includes the opening section 5131 for circulating a cooling gas from the space S2 side to the substrate 521. The opening shape of the opening section 5131 substantially coincides with the rotation range of the substrate 521. Consequently, it is possible to surely circulate a cooling gas circulated by the circulating device 55 to the substrate 521. Since the dimension of the opening section 5131 substantially coincides with the rotation range of the substrate 521, it is possible to prevent a cooling gas radially discharged during the rotation of the substrate 521 from circulating to the space S2 side and circulating toward the substrate 521 again. Therefore, it is possible to surely circulate a cooling gas having a relatively low temperature to the substrate 521. It is possible to more efficiently cool the phosphor.

Since the substrate 521 includes a plurality of fins 525, compared with when the plurality of fins 525 are absent, it is possible to increase a contact area with a cooling gas on the substrate 521. Therefore, it is possible to efficiently conduct heat of the substrate 521 to the cooling gas. It is possible to further improve the cooling efficiency of the substrate 521.

Since each of the plurality of fins 525 extends from the center side toward the outer side of the substrate 521, a cooling gas is easily radially discharged according to the rotation of the substrate 521. Therefore, it is possible to prevent the cooling gas, which has cooled the substrate 521 to have heat, from stagnating around the substrate 521.

Each of the plurality of fins 525 has a shape warping to the opposite side of the rotating direction of the substrate 521 from the center side toward the outer side of the substrate 521. Consequently, it is possible to make it easy to radially discharge a cooling gas having heat from the substrate 521.

Since a cooling gas circulates in the opposite direction of the rotating direction of the substrate 521, the fins 525 and the cooling gas collide to be opposed to each other. Consequently, it is possible to more efficiently cool the fins 525 with the cooling gas. Therefore, it is possible to more efficiently cool the substrate 521 and the phosphor.

The wavelength conversion device 5 includes the heat absorbing device 56 disposed inside the housing 51 and including the heat receiver 561 that receives heat of a circulated cooling gas. Consequently, since the heat of the cooling gas served for cooling of the substrate 521 is conducted to the heat receiver 561, it is possible to cool a cooling gas sucked by the circulating device 55 and circulating to the substrate 521.

The heat receiver 561 includes the first channel FP1 and the second channel FP2. Consequently, a cooling gas for which heat exchange is not sufficiently performed by the heat exchanger 561 in a process of circulating the cooling gas in the second channel FP2 circulates in the first channel FP1. Consequently, it is possible to receive a larger heat quantity from the cooling gas. It is possible to further cool the cooling gas.

Therefore, it is possible to surely lower the temperature of the cooling gas circulating to the substrate 521. It is possible to more efficiently cool the substrate 521 and the phosphor.

The heat absorbing device 56 includes the heat pipes 562 functioning as the heat conduction members, one ends of which are connected to the heat receiver 561 and the other ends of which are connected to the radiator 563. The heat conduction members conduct heat conducted to the heat receiver 561 to the radiator 563 located on the outside of the housing 51. Consequently, the heat conducted to the heat receiver 561 can be surely conducted to the outside of the housing 51 by the heat pipes 562. Therefore, it is possible to surely lower the temperature of a cooling gas inside the housing 51. Therefore, it is possible to more effectively cool the substrate 521, to which the cooling gas is circulated, and the phosphor.

In order to enlarge a contact area of the heat pipes 562 disposed in the second channel FP2 with the heat receiver 561 to be larger than a contact area of the heat pipes 562 disposed in the first channel FP1 with the heat receiver 561, the number of the heat pipes 5622 functioning as the second conduction members disposed in the second channel FP2 is larger than the number of the heat pipes 5621 functioning as the first heat conduction members disposed in the first channel FP1. Consequently, it is possible to more efficiently conduct heat conducted in the second channel FP2, in which a cooling gas having a relatively high temperature circulates, to the outside of the housing 51 than heat conducted in the first channel FP1, in which a cooling gas having a relatively low temperature circulates. Therefore, it is possible to efficiently conduct heat conducted to the heat receiver 561 to the outside of the housing 51 with a small number of the heat pipes 562. It is possible to efficiently cool a cooling gas with the heat receiver 561. Therefore, it is possible to circulate a cooling gas having a lower temperature to the substrate 521. It is possible to more efficiently cool the phosphor.

When relatively intense excitation light is made incident on the phosphor layer 522, a phenomenon called optical dust collection easily occurs. When dust is easily collected in this way, use efficiency of the excitation light is deteriorated. Besides, it is highly likely that a deficiency occurs in the rotation of the substrate 521 by the rotating device 53.

On the other hand, since the housing 51 is the sealed housing, it is possible to prevent dust from intruding into the housing 51. Therefore, it is possible to prevent the deterioration in the use efficiency of the excitation light. Besides, it is possible to configure the wavelength conversion device 5 having high reliability.

As shown in FIG. 6, when viewed from the +Z direction side along the rotation axis RA of the wavelength conversion element 52 (the substrate 521), in a part in the circumferential direction of the substrate 521 (e.g., a part 521C located on the +X direction side from the center C or a part 521D located on the +Y direction side from the center C), a cooling gas circulates in the opposite direction of the rotating direction of the substrate 521 in the part. Consequently, compared with when the cooling gas is blown against the substrate 521 along the rotation axis RA, it is possible to extend a time in which the cooling gas is in contact with the surface 521B of the substrate 521. Besides, since the cooling gas circulates in a direction against the rotation of the substrate 521 in the part, it is possible to increase relative flow velocity of the cooling gas with respect to the substrate 521. Therefore, it is possible to efficiently cool the substrate 521 and the phosphor of the phosphor layer 522.

The housing 51 includes the arcuate section 516 located on the outer side of the substrate 521 and extending along the circumferential direction during the rotation of the substrate 521 when the substrate 521 is viewed from the +Z direction side along the rotation axis RA. Consequently, it is possible to circulate a cooling gas circulated to the substrate 521 in the circumferential direction along the arcuate section 516. Therefore, it is possible to surely circulate the cooling gas in the opposite direction of the D direction by rotating the substrate 521 in the D direction. Therefore, it is possible to surely and efficiently cool the substrate 521 and the phosphor.

The discharge port 554 of the circulating device 55 is disposed to be shifted with respect to the imaginary line VL extending along the orthogonal direction to the rotation axis RA and passing the rotation axis RA to cross the arcuate section 516. Consequently, it is possible to make it easy to circulate a cooling gas discharged from the discharge port 554 while deviating the cooling gas to the disposition side of the discharge port 554 with respect to the imaginary line VL on the substrate 521. Therefore, in the part 521C, it is possible to surely circulate the cooling gas in the opposite direction of the rotating direction of the substrate 521. Besides, it is possible to make it easy to circulate the cooling gas along the arcuate section 516. Therefore, it is possible to more surely circulate the cooling gas in the opposite direction of the rotating direction of the substrate 521. Therefore, it is possible to more surely achieve the effects explained above.

The substrate 521 includes, on the surface 521B to which a cooling gas is circulated by the circulating device 55, the plurality of fins 525 extending from the center side toward the outer side of the substrate 521. The attachment member 54 that attaches the rotating device 53 to the inner surface of the side surface section 51B is provided inside the housing 51. When the substrate 521 is viewed from the +Z direction side along the rotation axis RA, the attachment member 54 is disposed in a position further on the center side of the substrate 521 than the plurality of fins 525 on the substrate 521.

Consequently, each of the plurality of fins 525 extends from the center side toward the outer side of the substrate 521. Therefore, it is possible to make it easy to radially discharge the cooling gas according to the rotation of the substrate 521. Consequently, it is possible to prevent the cooling gas, which has cooled the substrate 521 to have heat, from stagnating around the substrate 521.

In the part (e.g., the part 521C or the part 521D), since the circulating direction of the cooling gas and the rotating direction of the substrate 521 are opposite directions each other, it is possible to cause the cooling gas to collide with the fins 525 to be opposed to the fins 525. Therefore, it is possible to efficiently cool the fins 525 with the cooling gas. It is possible to efficiently cool the phosphor.

Further, since the attachment member 54 is located further on the center C side than the fins 525, it is possible to prevent the fins 525 from being covered by the attachment member 54. Consequently, it is possible to prevent a flow of the cooling gas circulating to the fins 525 from being hindered by the attachment member 54. It is possible to surely circulate the cooling gas along the surface 521B.

The attachment member 54 is formed in a cylindrical shape. Consequently, even when a part of a cooling gas circulates along the attachment member 54, for example, compared with when the attachment member projects to a channel side of the cooling gas, it is possible to prevent the attachment member 54 from hindering a flow of the cooling gas. Therefore, it is possible to smoothly circulate the cooling gas to the substrate 521.

As shown in FIG. 6, when viewed from the +Z direction side along the rotation axis RA of the wavelength conversion element 52 (the substrate 521), in a part in the circumferential direction of the substrate 521 (e.g., the part 521C located on the +X direction side from the center C or the part 521D located on the +Y direction side from the center C), a cooling gas circulates in the opposite direction of the rotating direction of the substrate 521 in the part. Consequently, compared with when the cooling gas is blown against the substrate 521 along the rotation axis RA, it is possible to extend a time in which the cooling gas is in contact with the surface 521B of the substrate 521. Besides, since the cooling gas circulates in a direction against the rotation of the substrate 521 in the part, it is possible to increase relative flow velocity of the cooling gas with respect to the substrate 521. Therefore, it is possible to efficiently cool the substrate 521 and the phosphor of the phosphor layer 522.

The housing 51 includes the arcuate section 516 located on the outer side of the substrate 521 and extending along the circumferential direction during the rotation of the substrate 521 when the substrate 521 is viewed from the +Z direction side along the rotation axis RA. Consequently, it is possible to circulate a cooling gas circulated to the substrate 521 in the circumferential direction along the arcuate section 516. Therefore, it is possible to surely circulate the cooling gas in the opposite direction of the D direction by rotating the substrate 521 in the D direction. Therefore, it is possible to surely and efficiently cool the substrate 521 and the phosphor.

The discharge port 554 of the circulating device 55 is disposed to be shifted with respect to the imaginary line VL extending along the orthogonal direction to the rotation axis RA and passing the rotation axis RA to cross the arcuate section 516. Consequently, it is possible to make it easy to circulate a cooling gas discharged from the discharge port 554 while deviating the cooling gas to the disposition side of the discharge port 554 with respect to the imaginary line VL on the substrate 521. Therefore, in the part 521C, it is possible to surely circulate the cooling gas in the opposite direction of the rotating direction of the substrate 521. Besides, it is possible to make it easy to circulate the cooling gas along the arcuate section 516. Therefore, it is possible to more surely circulate the cooling gas in the opposite direction of the rotating direction of the substrate 521. Therefore, it is possible to more surely achieve the effects explained above.

The substrate 521 includes, on the surface 521B to which a cooling gas is circulated by the circulating device 55, the plurality of fins 525 extending from the center side toward the outer side of the substrate 521. The attachment member 54 that attaches the rotating device 53 to the inner surface of the side surface section 51B is provided inside the housing 51. When the substrate 521 is viewed from the +Z direction side along the rotation axis RA, the attachment member 54 is disposed in a position further on the center side of the substrate 521 than the plurality of fins 525 on the substrate 521.

Consequently, since each of the plurality of fins 525 extends from the center side toward the outer side of the substrate 521, it is possible to make it easy to radially discharge the cooling gas according to the rotation of the substrate 521. Consequently, it is possible to prevent the cooling gas, which has cooled the substrate 521 to have heat, from stagnating around the substrate 521.

In the part (e.g., the part 521C and the part 521D), the circulating direction of the cooling gas and the rotating direction of the substrate 521 are opposite directions each other. Therefore, it is possible to cause the cooling gas to collide with the fins 525 to be oppose to the fins 525. Therefore, it is possible to efficiently cool the fins 525 with the cooling gas. It is possible to efficiently cool the phosphor.

Further, since the attachment member 54 is located further on the center C side than the fins 525, it is possible to prevent the fins 525 from being covered by the attachment member 54. Consequently, it is possible to prevent a flow of the cooling gas circulating to the fins 525 from being hindered by the attachment member 54. It is possible to surely circulate the cooling gas along the surface 521B.

The attachment member 54 is formed in a cylindrical shape. Consequently, even when a part of a cooling gas circulates along the attachment member 54, for example, compared with when the attachment member projects to a channel side of the cooling gas, it is possible to prevent the attachment member 54 from hindering a flow of the cooling gas. Therefore, it is possible to smoothly circulate the cooling gas to the substrate 521.

The housing 51, in which the wavelength conversion element 52 including the substrate 521 and the circulating device 55 are housed, includes the first partition wall 513 that partitions the space S2 (the first space) on the delivery side of a cooling gas to the substrate 521 and the space S3 (the second space) to which the cooling gas is discharged from the substrate 521.

Consequently, it is possible to prevent a cooling gas radially discharged from the substrate 521, that is, a cooling gas that has cooled the substrate 521 from circulating to the space S2 side while keeping heat and being circulated to the substrate 521 again. Therefore, it is possible to prevent a cooling gas having a high temperature from being supplied to the substrate 521. Therefore, it is possible to efficiently cool the substrate 521 on which the phosphor layer 522 is located and the phosphor of the phosphor layer 522.

Since it is possible to divide, with the partition wall 513, a cooling gas circulating toward the substrate 521 and a cooling gas discharged from the substrate 521, it is possible to prevent these cooling gases from colliding with each other. Therefore, it is possible to surely circulate the respective cooling gases.

When relatively intense excitation light is made incident on the phosphor layer 522, a phenomenon called optical dust collection easily occurs. When dust is easily collected in this way, use efficiency of the excitation light is deteriorated. Besides, it is highly likely that a deficiency occurs in the rotation of the substrate 521 by the rotating device 53.

On the other hand, since the housing 51 is the sealed housing, it is possible to prevent dust from intruding into the housing 51. Therefore, it is possible to prevent the deterioration in the use efficiency of the excitation light. Besides, it is possible to configure the wavelength conversion device 5 having high reliability.

The wavelength conversion device 5 includes the heat absorbing device 56 disposed inside the housing 51 and including the heat receiver 561 that receives heat of a circulated cooling gas. Consequently, since the heat of the cooling gas served for cooling of the substrate 521 is conducted to the heat receiver 561, it is possible to cool the cooling gas sucked by the circulating device 55 and circulating to the substrate 521.

The heat receiver 561 includes the first channel FP1 and the second channel FP2. Consequently, a cooling gas for which heat exchange is not sufficiently performed by the heat exchanger 561 in a process of circulating in the second channel FP2 circulates in the first channel FP1. Therefore, it is possible to receive a larger heat quantity from the cooling gas. It is possible to further cool the cooling gas.

Therefore, it is possible to surely lower the temperature of the cooling gas circulating to the substrate 521. It is possible to more efficiently cool the substrate 521 and the phosphor.

The first partition wall 513 includes the opening section 5131 for circulating a cooling gas from the space S2 side to the substrate 521. The dimension of the opening section 5131 substantially coincides with the rotation range of the substrate 521. Consequently, it is possible to surely circulate a cooling gas circulated by the circulating device 55 to the substrate 521 via the opening section 5131. Since the dimension of the opening section 5131 substantially coincides with the rotation range of the substrate 521, it is possible to prevent a cooling gas radially discharged during the rotation of the substrate 521 from circulating to the space S2 side and circulating toward the substrate 521 again. Therefore, it is possible to surely circulate a cooling gas having a relatively low temperature to the substrate 521. It is possible to more efficiently cool the phosphor.

Since the substrate 521 includes the plurality of fins 525, compared with when the plurality of fins 525 are absent, it is possible to increase a contact area with a cooling gas on the substrate 521. Therefore, it is possible to efficiently conduct heat of the substrate 521 to the cooling gas. It is possible to further improve the cooling efficiency of the substrate 521.

Since each of the plurality of fins 525 extends from the center side toward the outer side of the substrate 521, a cooling gas is easily radially discharged according to the rotation of the substrate 521. Therefore, it is possible to prevent the cooling gas, which has cooled the substrate 521 to have heat, from stagnating around the substrate 521.

Each of the plurality of fins 525 has a shape warping to the opposite side of the rotating direction of the substrate 521 from the center side toward the outer side of the substrate 521. Consequently, it is possible to make it easy to radially discharge a cooling gas having heat from the substrate 521.

Since a cooling gas circulates in the opposite direction of the rotating direction of the substrate 521, the fins 525 and the cooling gas collide to be opposed to each other. Consequently, it is possible to more efficiently cool the fins 525 with the cooling gas. Therefore, it is possible to more efficiently cool the substrate 521 and the phosphor.

The heat absorbing device 56 includes the heat pipes 562 functioning as the heat conduction members, one ends of which are connected to the heat receiver 561 and the other ends of which are connected to the radiator 563. The heat conduction members conduct heat conducted to the heat receiver 561 to the radiator 563 located on the outside of the housing 51. Consequently, the heat conducted to the heat receiver 561 can be surely conducted to the outside of the housing 51 by the heat pipes 562. Therefore, it is possible to surely lower the temperature of a cooling gas inside the housing 51. Therefore, it is possible to more effectively cool the substrate 521, to which the cooling gas is circulated, and the phosphor.

In order to enlarge a contact area of the heat pipes 562 disposed in the second channel FP2 with the heat receiver 561 to be larger than a contact area of the heat pipes 562 disposed in the first channel FP1 with the heat receiver 561, the number of the heat pipes 5622 functioning as the second conduction members disposed in the second channel FP2 is larger than the number of the heat pipes 5621 functioning as the first heat conduction members disposed in the first channel FP1. Consequently, it is possible to more efficiently conduct heat conducted in the second channel FP2, in which a cooling gas having a relatively high temperature circulates, to the outside of the housing 51 than heat conducted in the first channel FP1, in which a cooling gas having a relatively low temperature circulates. Therefore, it is possible to efficiently conduct heat conducted to the heat receiver 561 to the outside of the housing 51 with a small number of the heat pipes 562. It is possible to efficiently cool a cooling gas with the heat receiver 561. Therefore, it is possible to circulate a cooling gas having a lower temperature to the substrate 521. It is possible to more possible to efficiently cool the phosphor.

Second Embodiment

A second embodiment of the present invention is explained.

A projector 1a according to this embodiment includes the same components as the components of the projector 1. However, the projector 1a includes, instead of the heat receiver 561, a heat receiver 561a including a segmenting section that segments the first channel FP1 and the second channel FP2. The projector 1a according to this embodiment is different from the projector 1 in this respect. Note that, in the following explanation, the same or substantially the same portions as the portions explained above are denoted by the same reference numerals and signs and explanation of the portions is omitted.

Figure 9:
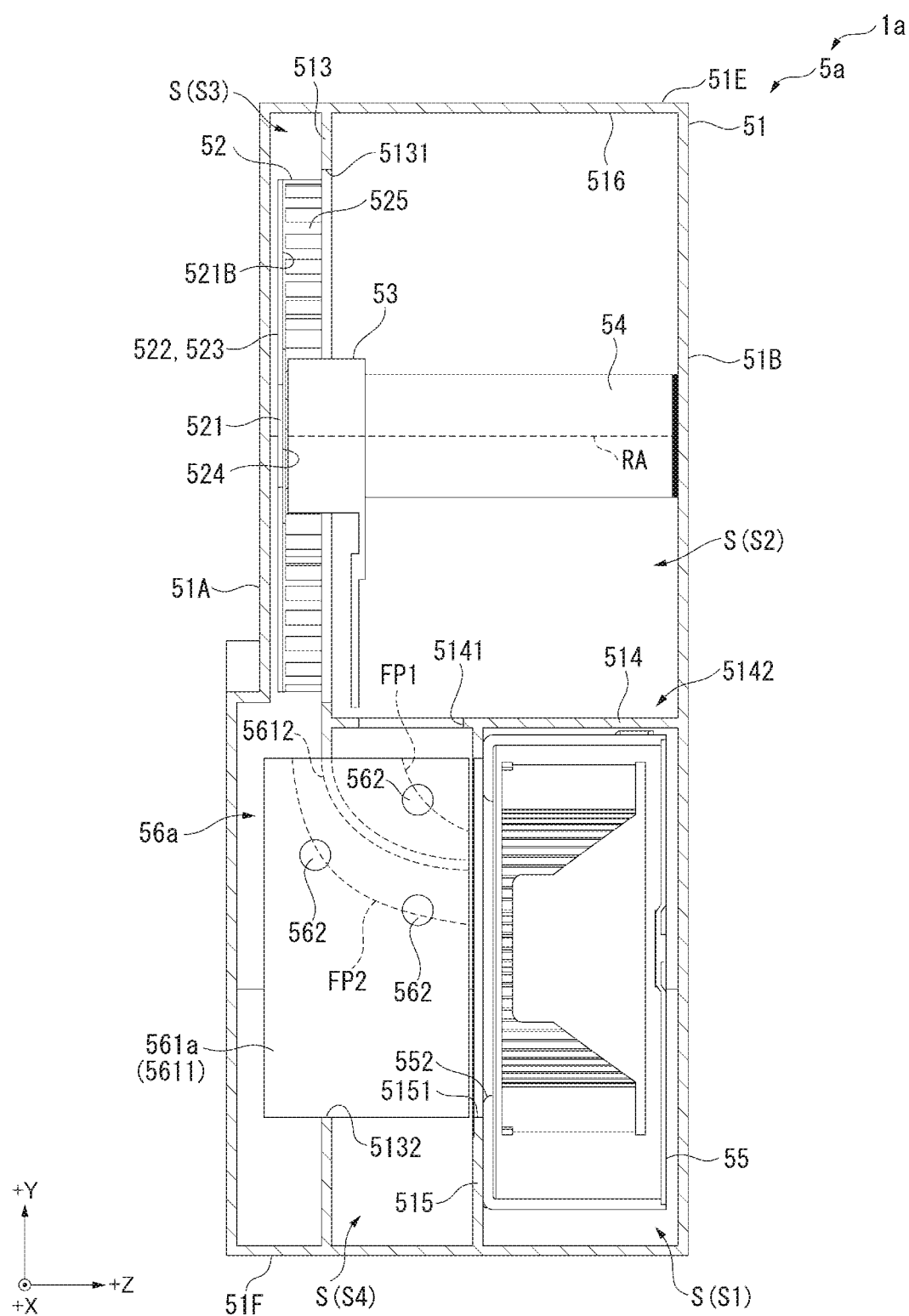
FIG. 9 is a sectional view showing a wavelength conversion device included in a projector according to a second embodiment of the present invention.

FIG. 9 is a diagram showing a cross section taken along the YZ plane of a wavelength conversion device 5a included in the projector 1a according to this embodiment.

The projector 1a according to this embodiment has the same components and the same functions as the components and the functions of the projector 1 except that the projector 1a includes the wavelength conversion device 5a instead of the wavelength conversion device 5. This wavelength conversion device 5a has the same components and the same functions as the components and the functions of the wavelength conversion device 5 except that the wavelength conversion device 5a includes a heat absorbing device 56a instead of the heat absorbing device 56. Further, the heat absorbing device 56a has the same components and the same functions as the components and the functions of the heat absorbing device 56 except that the heat absorbing device 56a includes the heat receiver 561a instead of the heat receiver 561.

Like the heat receiver 561, the heat receiver 561a is formed by the plurality of fins 5611 which are each a tabular body made of metal. The first channel FP1 and the second channel FP2 are formed on the inside of the heat receiver 561a. As a difference from the heat receiver 561, this heat receiver 561a includes, on the inside, a segmenting section 5612 that partitions the first channel FP1 and the second channel FP2.

This segmenting section 5612 is connected to the end edge of the opening section 5132 of the first partition wall 513 at an end portion on the +Y direction side in the heat receiver 561a. The segmenting section 5612 bends from the end portion on the +Y direction side to pass between the heat pipe 562 provided on the first channel FP1 and two heat pipes 562 provided on the second channel FP2 and extends to an end portion on the +Z direction side in the heat receiver 561a.

With such a segmenting section 5612, it is possible to prevent a cooling gas having a relatively high temperature circulating in the second channel FP2 from circulating to the first channel FP1 side in which the number of the set heat pipes 562 is small. Therefore, it is possible to prevent heat exceeding a heat quantity conductible to the radiator 563 by the heat pipes 562 from being conducted to a region on the first channel FP1 side of the heat receiver 561a. It is possible to efficiently conduct the heat conducted to the heat receiver 561a to the radiator 563.

When a suction force by the circulating device 55 is high, a cooling gas that has cooled the wavelength conversion element 52 flows into the heat receiver and, immediately thereafter, circulates in the +Z direction to be absorbed by the circulating device 55. It is likely that heat cannot be sufficiently received from the cooling gas. On the other hand, since a cooling gas can be circulated along the segmenting section 5612, as a channel length in which the cooling gas circulates inside the heat receiver 561a, it is possible to make it easy to secure a channel length in which heat can be sufficiently received from the cooling gas. Therefore, it is possible to surely cool the cooling gas. It is possible to improve cooling efficiency of the wavelength conversion element 52.

Effects of the Second Embodiment

With the projector according to this embodiment explained above, it is possible to achieve the same effects as the effects of the projector 1. Besides, it is possible to achieve effects explained blow.

The heat receiver 561a includes the segmenting section 5612 that is connected to the end edge of the opening section 5132 in the first partitioning wall 513 and separates the first channel FP1 and the second channel FP2. Consequently, it is possible to prevent a cooling gas circulating in the second channel FP2 from circulating in the first channel FP1 having a short channel length. Therefore, a cooling gas that has cooled the wavelength conversion element 52 (the substrate 521) circulates in the heat receiver 561a in a relatively long distance and for a relatively long time. Therefore, it is possible to sufficiently receive heat from the cooling gas. It is possible to more surely cool the cooling gas.

Third Embodiment

A third embodiment of the present invention is explained below with reference to the drawings.

A projector 1b according to this embodiment includes the same components as the components of the projector 1. However, the projector 1b includes, instead of the wavelength conversion device 5, a wavelength conversion device 5b in which an arcuate slope 51D1 is formed. The projector 1b according to this embodiment is mainly different from the projector 1 in this respect. Note that, in the following explanation, the same or substantially the same portions as the portions explained above in the first embodiment are denoted by the same reference numerals and signs and explanation of the portions is omitted.

[Schematic Configuration of the Projector]

The projector 1b according to this embodiment has the same components and the same functions as the components and the functions of the projector 1 except that the projector 1b includes the wavelength conversion device 5b instead of the wavelength conversion device 5.

The configuration of the wavelength conversion device 5b included in the projector 1b is explained below.

[Configuration of the Wavelength Conversion Device]

Figure 10:
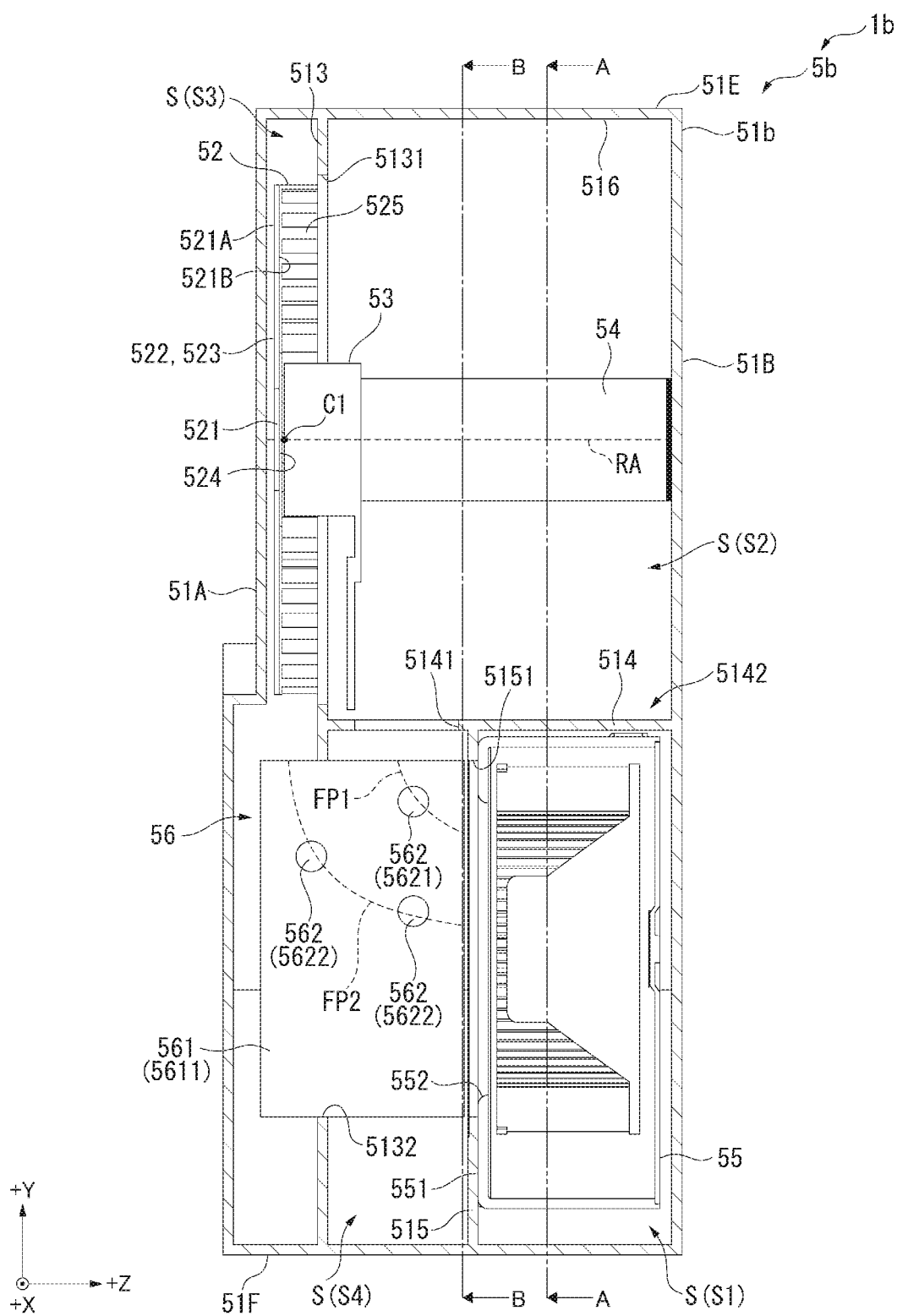
FIG. 10 is a sectional view showing a wavelength conversion device according to a third embodiment of the present invention.
Figure 11:
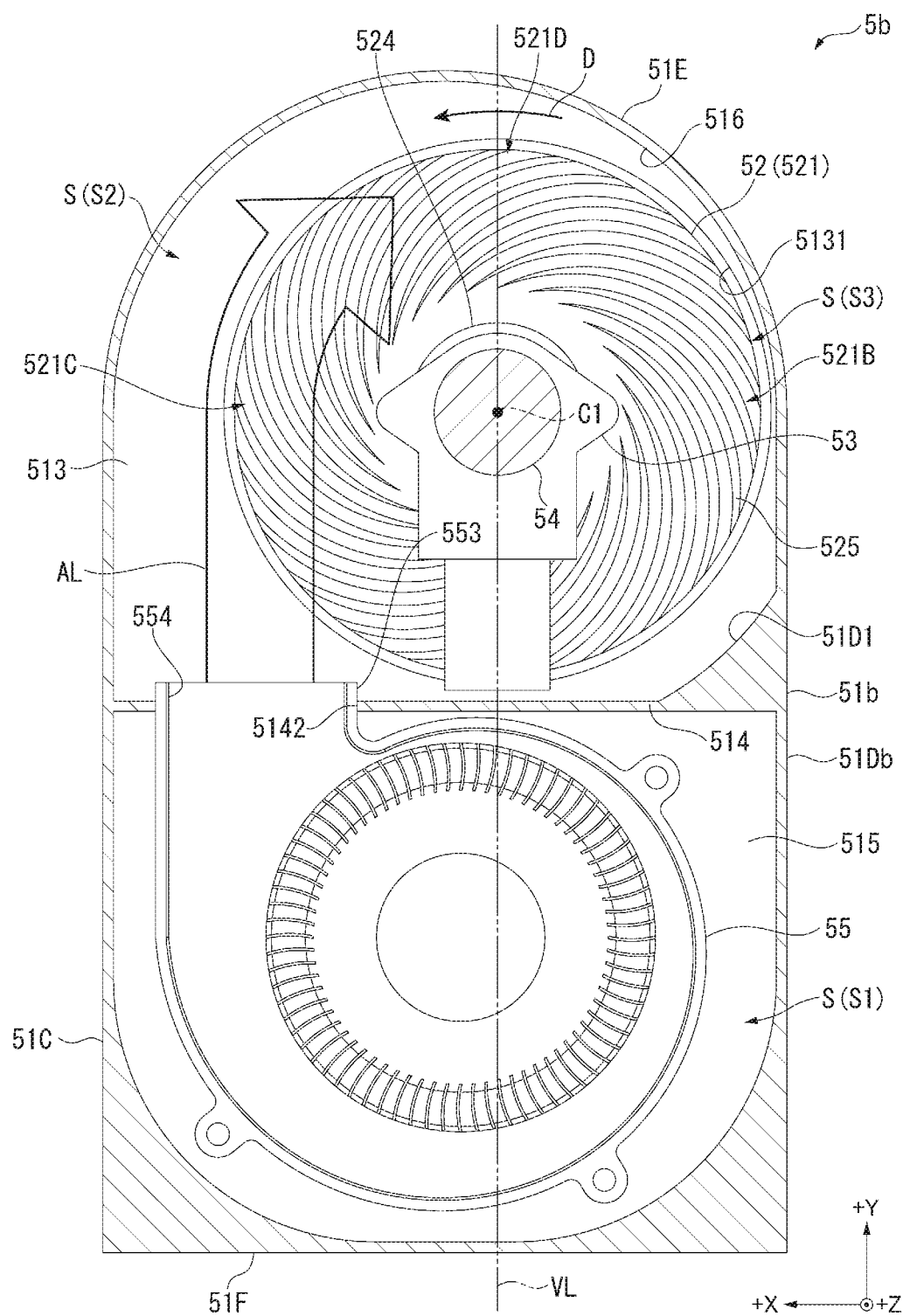
FIG. 11 is a sectional view taken along an A-A line of the wavelength conversion device shown in FIG. 10.
Figure 12:
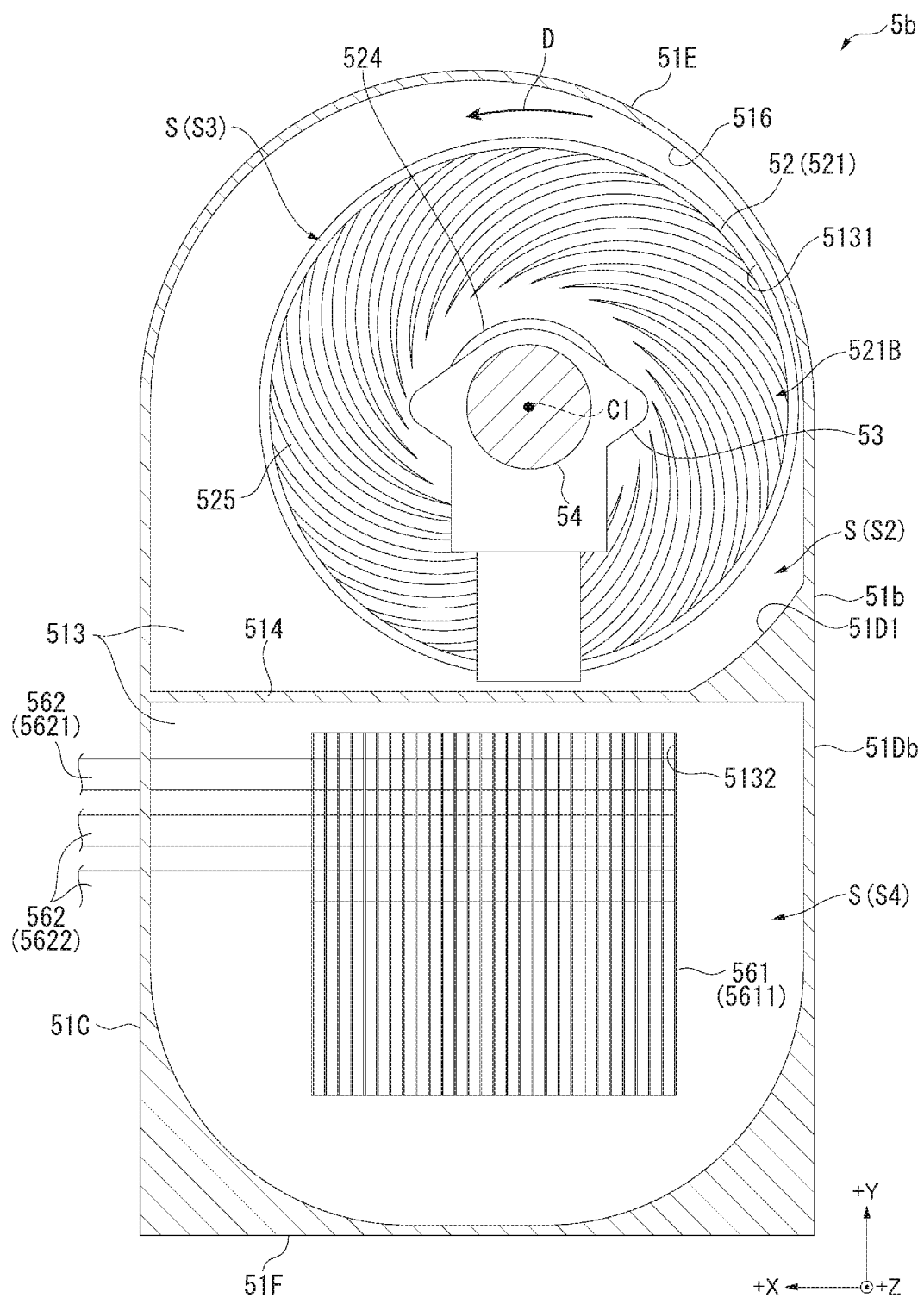
FIG. 12 is a sectional view taken along a B-B line of the wavelength conversion device shown in FIG. 10.

FIG. 10 is a sectional view showing the wavelength conversion device 5b included in the projector 1b according to this embodiment. Further, FIG. 11 is a sectional view taken along an A-A line of the wavelength conversion device 5b in FIG. 10. FIG. 12 is a sectional view taken along a B-B line of the wavelength conversion device 5b in FIG. 10.

As shown in FIG. 10 to FIG. 12, the wavelength conversion device 5b includes a housing 51b.

In the following explanation, a traveling direction of the excitation light with respect to the wavelength conversion device 5b is represented as a +Z direction. Directions respectively orthogonal to the +Z direction and orthogonal to each other are represented as a +X direction and a +Y direction. Among these directions, the +X direction is set as a direction in which the radiator 563 is located with respect to the housing 51b. The +Y direction is set as a direction orthogonal to each of the +Z direction and the +X direction and directed toward the wavelength conversion element 52 from the circulating device 55 and the heat receiver 561 when viewed from the +Z direction side. For convenience of explanation, the opposite direction of the +Z direction is represented as a −Z direction. The same applies to a −X direction and a −Y direction.

Note that, in this embodiment, the wavelength conversion element 52 is rotated around a rotation axis extending along the +Z direction by the rotating device 53 explained below. Therefore, the +Z direction is equivalent to the first direction of the present invention. When the wavelength conversion element 52 is viewed from the +Z direction side and the +Y direction orthogonal to the +Z direction is viewed as a 12 o'clock direction, the +X direction is a 9 o'clock direction. Therefore, the +Y direction is equivalent to the second direction of the present invention. The +X direction is equivalent to the third direction of the present invention.

[External Configuration of the Housing]

The housing 51b has the same components and the same functions as the components and the functions of the housing 51 except that the housing 51b includes a side surface section 51Db instead of the side surface section 51D.

In the housing 51b in this embodiment, the side surface section 51A is equivalent to the first side surface section. The side surface sections 51C, 51Db, and 51E crossing the side surface section 51A are equivalent to the second side surface section.

[Internal Configuration of the Housing]

The housing 51b includes, as shown in FIG. 10, on the inside, the first partition wall 513, the second partition wall 514, and the third partition wall 515 that segment the housing space S to form the spaces S1 to S4.

The first partition wall 513 is formed along the XY plane in a position apart from the side surface section 51A by a predetermined space on the inside of the housing 51b to be connected to the inner surfaces of the side surface sections 51C, 51Db, 51E, and 51F. In the space S3 (a second space) surrounded by the first partition wall 513 and the inner surfaces of the side surface sections 51A, 51C, 51Db, 51E, and 51F, the wavelength conversion element 52 and a part on the −Z direction side in the rotating device 53 are disposed in positions on the +Y direction side. A part on the −Z direction side in the heat receiver 561 is disposed in a position on the −Y direction side.

That is, the first partition wall 513 is disposed to be opposed to the side surface section 51A across the wavelength conversion element 52 and is connected to the inner surfaces of the side surface sections 51C, 51Db, 51E, and 51F.

As shown in FIG. 11 and FIG. 12, the arcuate section 516 centering on a center C2 located in the +X direction from a center C1 of the wavelength conversion element 52 (the center C1 of the substantially circular substrate 521) when viewed from the +Z direction side is formed by the inner surfaces of the side surface sections 51C, 51Db, and 51E. That is, the side surface sections 51C, 51Db, and 51E surrounding the wavelength conversion element 52 include the arcuate section 516 centering on the center C2. The space S2 is formed by the inner surfaces of these side surface sections 51C, 51Db, and 51E, the surface on the +Y direction side in the second partition wall 514, and the inner surface of the side surface section 51B. Therefore, the space S2 is a space having a shape obtained by combining a circle and a rectangle when viewed from the +Z direction side.

Note that a region on the +Y direction side on the inner surface of the side surface section 51C is a flat surface extending along the YZ plane and is substantially orthogonal to the second partition wall 514. A region on the +Y direction side on the inner surface of the side surface section 51Db opposed to the side surface section 51C is also a flat surface extending along the YZ plane. However, on the inner surface, the slope 51D1 having an arcuate shape connected to a surface on the +Y direction side of the second partition wall 514 is formed. The slope 51D1 extends along the circumferential direction of the wavelength conversion element 52 (the substrate 521). However, the slope 51D1 is formed spaced apart from the wavelength conversion element 52. A cooling gas that has cooled the wavelength conversion element 52 (the substrate 521) is easily discharged from a region where the wavelength conversion element 52 and the side surface sections 51Db and 51E are closest to each other.

[Configuration of the Wavelength Conversion Element]

The wavelength conversion element 52 has the same components and the same functions as the components and the functions in the first embodiment. The surface 521A of the substrate 521 is equivalent to the second surface of the present invention. The surface 521B on the opposite side of the surface 521A is equivalent to the first surface of the present invention.

[Configuration of the Rotating Device]

The rotating device 53 is configured by, for example, a motor that rotates the rotating device 53 around the rotation axis RA passing the center C1 of the wavelength conversion element 52 and extending along the +Z direction as shown in FIG. 10 to FIG. 12.

[Configuration of the Attachment Member]

One end of the attachment member 54 is connected to the rotating device 53 and the other end of the attachment member 54 is fixed to the inner surface of the side surface section 51B on the +Z direction side in the housing 51b, whereby the rotating device 53 is attached inside the housing 51b.

[Configuration of the Circulating Device]

The circulating device 55 is equivalent to the delivering device and the suction device of the present invention. The circulating device 55 circulates a cooling gas inside the housing 51*b* and circulates the cooling gas to the wavelength conversion element 52 (in detail, the plurality of fins 525). This circulating device 55 has the same components and the same functions as the components and the functions in the first embodiment.

As shown in FIG. 11, the discharge section 553 (the discharge port 554) of the circulating device 55 is disposed to be shifted in the +X direction with respect to the imaginary line VL passing the center C1 of the wavelength conversion element 52 and extending along the +Y direction to cross the arcuate section 516.

[Circulation Channel of a Cooling Gas Inside the Housing]

Figure 13:
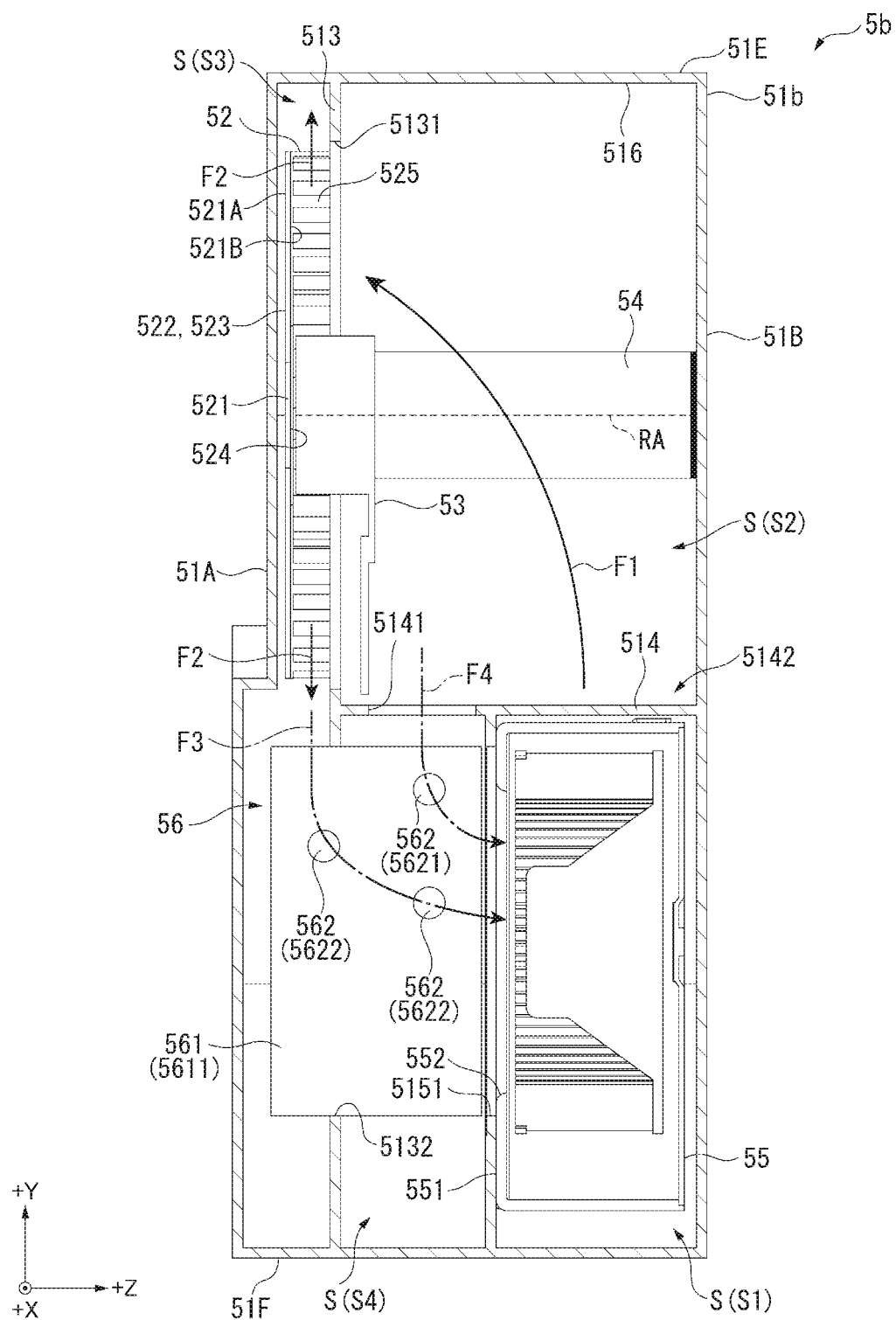
FIG. 13 is a schematic diagram showing a flow of a cooling gas in a housing in the third embodiment.

FIG. 13 is a schematic diagram showing a circulation channel of a cooling gas inside the housing 51*b*.

As in the embodiments explained above, a cooling gas inside the housing 51*b* is circulated by the circulating device 55. Note that a cooling gas that has cooled the wavelength conversion element 52 is radially discharged into the space S3 from among the fins 525 centering on the center C1 when viewed from the +Z direction side according to the rotation of the wavelength conversion element 52 by the rotating device 53 as indicated by the arrow F2.

[Flow of a Cooling Gas Discharged to a Space in which the Wavelength Conversion Element is Located]

Figure 14:
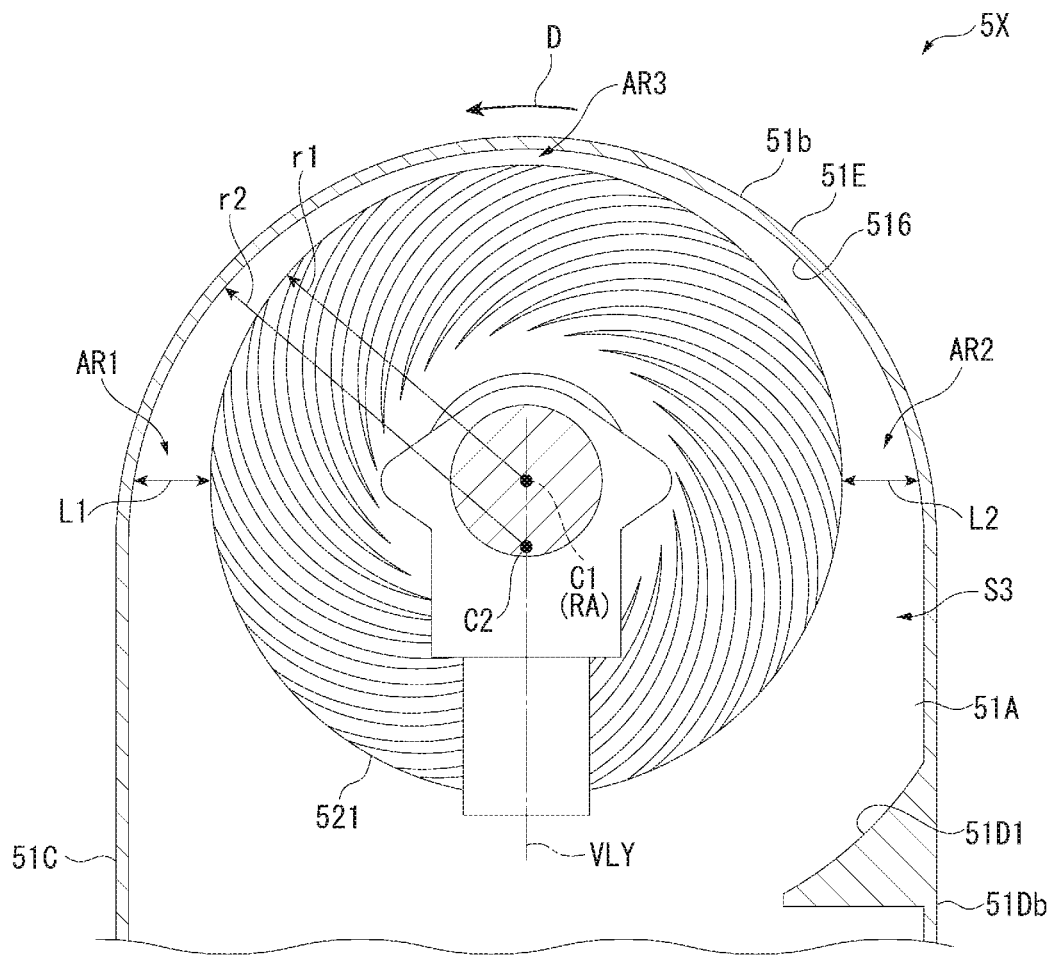
FIG. 14 is a diagram showing a space in which a wavelength conversion element is disposed in a wavelength conversion device in a comparative example of the third embodiment.

FIG. 14 is a diagram of the space S3 viewed from the +Z direction side in a wavelength conversion device 5X in a comparative example of the wavelength conversion device 5*b*.

In the wavelength conversion device 5X in the comparative example of the wavelength conversion device 5*b* in this embodiment, a flow of a cooling gas that has cooled the wavelength conversion element 52 (the substrate 521) is explained with reference to FIG. 14. Note that, in the following explanation, a cooling gas served for cooling of the substrate 521 and discharged from the substrate 521 is abbreviated as post-cooling gas.

Although detailed illustration is omitted, the wavelength conversion device 5X has the same configuration as the configuration of the wavelength conversion device 5*b* except that disposition positions of the wavelength conversion element 52, the rotating device 53, and the attachment member 54 are different.

In this wavelength conversion device 5X, as shown in FIG. 14, the center C1 of the wavelength conversion element 52 (the substrate 521) and the center C2 of an arc of the arcuate section 516 are located on the same imaginary line VLY extending along the +Y direction. That is, the center C2 is located neither in the +X direction nor in the −X direction with respect to the center C1 and is located on the −Y direction side with respect to the center C1. Note that a radius r2 of an arc of the side surface section 51E is set larger than a radius r1 during the rotation of the substrate 521. The substrate 521 is rotated in the D direction, which is a counterclockwise direction when viewed from the +Z direction side.

In such a wavelength conversion device 5X, in the space S3, a first region AR1, which is a region between the side surface sections 51E and 51C located on the +X direction side with respect to the center C1 and the substrate 521, and a second region AR2, which is a region between the side surface sections 51E and 51Db located on the −X direction side with respect to the center C1 and the substrate 521 have the same size. Specifically, a dimension L1 along an X direction in the first region AR1 and a dimension L2 along the X direction in the second region AR2 are the same dimension.

Therefore, flow velocity of a post-cooling gas circulating in the first region AR1 along the −Y direction, which is a sucking direction of the post-cooling gas by the circulating device 55, is higher than flow velocity of a post-cooling gas circulating in the second region AR2. However, a post-cooling gas easily stagnates in a region AR3 (the region AR3 on the +Y direction side with respect to the substrate 521) where the distance between the substrate 521 and the side surface sections 51C, 51Db, and 51E is the shortest. A post-cooling gas less easily circulates in the −Y direction. When a post-cooling gas in the region AR3, which is such a stagnation place, is not discharged, the substrate 521 is always exposed to a post-cooling gas having a relatively high temperature. Cooling efficiency of the substrate 521 is deteriorated.

Figure 15:
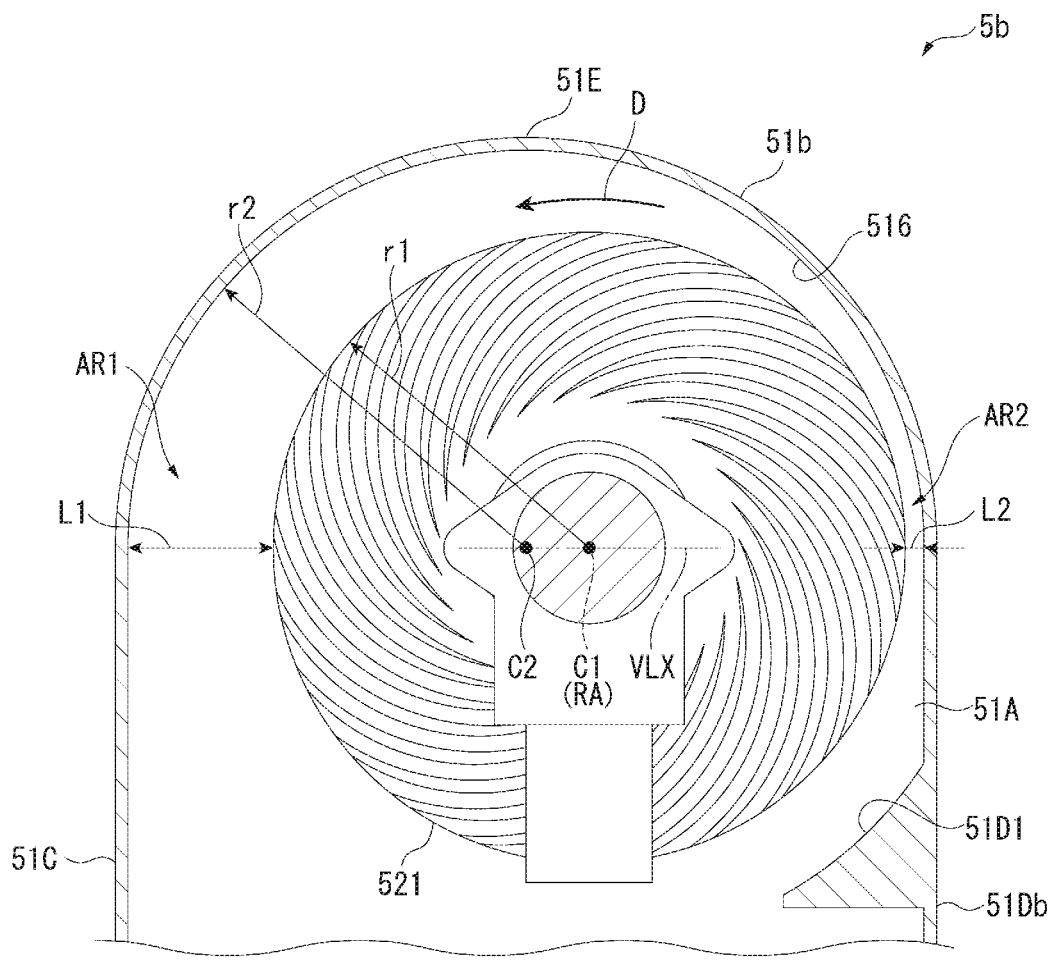
FIG. 15 is a diagram showing a space in which a wavelength conversion element is disposed in the wavelength conversion device in the third embodiment.

FIG. 15 is a diagram of the space S3 viewed from the +Z direction side in the wavelength conversion device 5*b*.

As opposed to the wavelength conversion device 5X explained above, in the wavelength conversion device 5*b*, as shown in FIG. 15, the radius r2 of the arc of the side surface section 51E is set larger than the radius r1 during the rotation of the substrate 521.

The center C1 of the wavelength conversion element 52 (the substrate 521) and the center C2 of the arc of the side surface section 51E are located on the same imaginary line VLX extending along the +X direction. That is, the center C2 is located on the +X direction side with respect to the center C1. Therefore, at least a part of a region where the substrate 521 and the side surface sections 51C, 51Db, and 51E surrounding the substrate 521 are closest to each other overlaps the region AR2 located on the −X direction side with respect to the substrate 521.

In the space S3, the dimension L1 of the first region AR1 is a dimension larger than the dimension L2 of the second region AR2. The first region AR1 is a region larger than the second region AR2. On the other hand, the second region AR2 is a region opened to the −Y direction side. Further, the substrate 521 is rotated in the D direction, which is a counterclockwise direction when viewed from the +Z direction side. The sucking direction of the post-cooling gas by the circulating device 55 is the −Y direction. Therefore, flow velocity of the post-cooling gas circulating in the first region AR1 is higher than flow velocity of the post-cooling gas circulating in the second region AR2.

Consequently, sizes and flow velocities of a circulating post-cooling gas are different in the first region AR1 and the second region AR2. Therefore, a post-cooling gas discharged to a region where the distance between the substrate 521 and the side surface sections 51C, 51Db, and 51E is the closest easily circulates to one of the first region AR1 and the second region AR2. In this embodiment, a post-cooling gas easily circulates to the second region AR side, at least a part of which overlaps a place where the post-cooling gas easily stagnates and which is opened to the −Y direction side. Therefore, it is possible to prevent a stagnation place such as the region AR3 from occurring. It is possible to reduce the stagnation place even when the stagnation place occurs. Consequently, it is possible to make it easy to circulate a post-cooling gas from the first region AR1 and the second region AR2 to the −Y direction side. It is possible to quickly discharge the post-cooling gas. Therefore, it is possible to improve cooling efficiency of the substrate 521 and the phosphor layer 522 while achieving a reduction in the size of the housing 51*b*.

Effects of the Embodiment

With the projector 1*b* according to this embodiment explained above, there are effects explained below.

The radius r2 of the arc of the arcuate section 516 of the side surface sections 51C, 51Db, and 51E is set larger than the radius r1 during the rotation of the substrate 521 of the wavelength conversion element 52. The center C2 of the arc of the arcuate section 516 is located on the +X direction side with respect to the center C1 of the substrate 521 of the wavelength conversion element 52. Consequently, as explained above, it is possible to prevent the post-cooling gas from stagnating between the substrate 521 and the side surface sections 51C, 51Db, and 51E. Therefore, it is possible to improve cooling efficiency of the substrate 521 and the phosphor of the phosphor layer 522 while forming the side surface sections 51C, 51Db, and 51E along the circumferential direction of the rotated substrate 521 and achieving a reduction in the size of the housing 51b.

The housing 51b includes the first partition wall 513 opposed to the side surface section 51A across the substrate 521 and connected to the side surface sections 51C, 51Db, and 51E. The first partition wall 513 includes the opening section 5131 for circulating a cooling gas to the surface 521B of the substrate 521 on which the fins 525 are formed. An opening shape of this opening section 5131 substantially coincides with the rotation range of the substrate 521. Consequently, it is possible to prevent the air, which has cooled the substrate 521 and is radially discharged, from being sucked according to the rotation of the substrate 521 and circulated to the surface 521B side again while keeping heat. Therefore, since it is possible to prevent a cooling gas having heat from circulating to the substrate 521, it is possible to efficiently cool the substrate 521 and the phosphor of the phosphor layer 522.

Since the substrate 521 includes the plurality of fins 525, compared with when the plurality of fins 525 are absent, it is possible to increase a contact area with a cooling gas on the substrate 521. Therefore, it is possible to efficiently conduct heat of the substrate 521 to the cooling gas. It is possible to further improve the cooling efficiency of the substrate 521.

Each of the plurality of fins 525 has a shape warping to the opposite side of the rotating direction of the substrate 521 from the center side toward the outer side of the substrate 521. Consequently, it is possible to make it easy to radially discharge a cooling gas having heat from the substrate 521.

Note that a cooling gas circulates in the opposite direction of the rotating direction of the substrate 521. Therefore, for example, in the parts 521C and 521D, the cooling gas collides with the fins 525 to be opposed to the fins 525. Consequently, it is possible to efficiently cool the fins 525 with the cooling gas. Therefore, it is possible to more efficiently cool the substrate 521 and the phosphor.

Since the housing 51b is the sealed housing, it is possible to prevent dust from intruding into the housing 51b. Therefore, it is possible to prevent deterioration in use efficiency of excitation light emitted from the light source section 41. Besides, it is possible to configure the wavelength conversion device 5b having high reliability.

The heat receiver 561 provided in the housing 51b receives heat from a cooling gas that has cooled the substrate 521. Therefore, it is possible to lower the temperature of the cooling gas inside the housing 51b, which is the sealed housing. It is possible to lower the temperature of the cooling gas circulated to the substrate 521. Therefore, it is possible to further improve the cooling efficiency of the substrate 521.

The circulating device 55 functioning as a heat absorbing device as well is located on the −Y direction side with respect to the substrate 521 when viewed from the +Z direction side. The circulating device 55 sucks a post-cooling gas discharged according to the rotation of the substrate 521. Consequently, it is possible to specify a circulating direction of the post-cooling gas discharged from the substrate 521 and circulating in the space S3 in the −Y direction. Therefore, it is possible to make it easy to circulate the post-cooling gas from the first region AR1 and the second region AR2 in the −Y direction. Since the post-cooling gas can be quickly discharged, it is possible to more suitably achieve the effects explained above.

The circulating device 55 has not only a function of the delivering device but also a function of the suction device. Therefore, it is possible to circulate a cooling gas inside the housing 51b without increasing the number of components. It is possible to suitably achieve the effects explained above.

Modifications of the Embodiments

The present invention is not limited to the embodiments. Modifications, improvements, and the like in a range in which the object of the present invention can be achieved are included in the present invention.

The wavelength conversion devices 5, 5a, and 5b include the reflection layer 523 that causes the second pickup lens 49 to reflect fluorescent light generated in the phosphor layer 522 according to incidence of excitation light from the second pickup lens 49. That is, the wavelength conversion devices 5, 5a, and 5b are wavelength conversion devices of a reflection type that reflect fluorescent light generated by incidence of excitation light. On the other hand, the wavelength conversion devices 5, 5a, and 5b may be configured as wavelength conversion elements of a transmission type in which generated fluorescent light is emitted along a traveling direction of excitation light made incident on the wavelength conversion element 52.

In this case, for example, instead of the reflection layer 523, a wavelength-selective reflection layer that transmits excitation light and reflects fluorescent light is disposed on an incident side of the excitation light with respect to the phosphor layer 522. The substrate 521 is formed as a light transmissive substrate. Besides, the fins 525 are not provided in a part corresponding to an incident position of the excitation light on the surface 521B. Further, an opening section, from which generated fluorescent light is emitted, is formed in the side surface section 51B on the +Z direction side. Consequently, the wavelength conversion device of the transmission type can be configured. Note that, in such a wavelength conversion device, sealability of the housings 51 and 51b is kept by closing the opening section of the side surface section 51B, from which the fluorescent light is emitted, with a translucent member. Note that the phosphor layer 522 may be located on the surface 521B on which the fins 525 are located.

In the wavelength conversion device 5, 5a, and 5b, the rotating device 53 that rotates the wavelength conversion element 52 (the substrate 521) is housed in the housings 51 and 51b. On the other hand, for example, a motor main body of the motor configuring the rotating device 53 may be disposed outside the housings 51 and 51b. A spindle extended from the motor main body and connected to the connecting section 524 of the substrate 521 may be disposed inside the housings 51 and 51b.

The circulating device 55 is configured by the sirocco fan disposed in the spaces S1 and S2. The circulating device 55 sucks a cooling gas circulating to the heat receiver 561 located in the space S4 and circulates the cooling gas to the wavelength conversion element 52 (the substrate 521)

located in the space S3. However, a disposition position of the circulating device 55 may be anywhere in the housings 51 and 51b and may be, for example, inside the space S2.

The circulating device 55 does not have to be the sirocco fan. The circulating device 55 may include other delivering means such as an axial flow fan as long as the circulating device 55 can circulate a cooling gas to the wavelength conversion element 52 (the substrate 521).

Further, the circulating device 55 functions as the delivering device and the suction device. However, the delivering device and the suction device may be individually provided.

The housings 51 and 51b include the partition walls 513 to 515 that segment the housing space S in the housings 51 and 51b into the spaces S1 to S4. However, the second partition wall 514 and the third partition wall 515 may be absent. In this case, in a circulating direction of a cooling gas, a space from the circulating device 55 to the wavelength conversion element 52 is the first space. A space from the wavelength conversion element 52 to the circulating device 55 is the second space. When the housings 51 and 51b include the third partition wall 515 and an end edge on the +Y direction side in the heat receiver 561 and end edges on the +X direction side and the −X direction side in the heat receiver 561 are in contact with the first partition wall 513, the first partition wall 513 does not have to be connected to the inner surface of the side surface section 51F. Further, the first partition wall 513 may be absent as long as a cooling gas circulating to the wavelength conversion element 52 (the substrate 521) and a cooling gas discharged from the wavelength conversion element 52 do not collide.

In addition, the housings 51 and 51b are the sealed housings. However, the housings 51 and 51b do not have to be the sealed housings.

The opening shape of the opening section 5131 included in the first partition wall 513 substantially coincides with the rotation range of the substrate 521. That is, the center of the opening section 5131 substantially coincides with the center C or the center C1 of the substrate 521 when viewed from the +Z direction side and the inner diameter dimension of the opening section 5131 substantially coincides with the diameter dimension during the rotation of the substrate 521. However, the inner diameter dimension of the opening section 5131 may be smaller than the diameter dimension during the rotation of the substrate 521. The center of the opening section 5131 and the center C or the center C1 of the substrate 521 may be shifted. Further, the size of the opening surface of the opening section 5131 (the area of an imaginary surface surrounded by the end edges of the opening sections 5131) may be smaller than or may be larger than the rotation range of the substrate 521. For example, the inner diameter dimension of the opening section 5131 may be larger than the diameter dimension during the rotation of the substrate 521 as long as a cooling gas that has cooled the substrate 521 does not circulate to the surface 521B side again from a gap between the end edge of the opening section 5131 and the substrate 521.

In the substrate 521, the plurality of fins 525 extending from the center side toward the outer side of the substrate 521 are disposed on the surface 521B to which a cooling gas is circulated by the circulating device 55. On the other hand, such fins 525 may be absent as long as the gas, which has cooled the substrate 521, can be radially discharged. The shape of the fins 525 does not have to be the shape warping in the opposite direction of the rotating direction of the substrate 521 (the D direction) toward the outer side. For example, the fins 525 may linearly extend from the center side toward the outer side.

Inside the housings 51 and 51b, the heat receiver 561, which receives heat from a circulating cooling gas, is disposed in the space S4. Heat conducted to the heat receiver 561 is conducted to the radiator 563 disposed outside the housings 51 and 51b by the heat pipes 562 functioning as the heat conduction members. Such a heat receiver 561 may be disposed in other positions and may be disposed, for example, inside the space S3. Further, the number of the heat pipes 562 adopted as the heat conduction members can be changed as appropriate. The same number of the heat pipes 562 may be disposed in the first channel FP1 and the second channel FP2. A large number of the heat pipes 562 may be disposed in the first channel FP1. In addition, Peltier elements (thermoelectric elements) may be adopted instead of the heat pipes 562.

The heat receiver 561 includes the first channel FP1 in which a cooling gas inside the space S2 circulates and the second channel FP2 in which a cooling gas that has cooled the wavelength conversion element 52 circulates from the space S3. However, the heat receiver 561 is not limited to this. The first channel FP1 may be absent.

In the wavelength conversion devices 5, 5a, and 5b, the number of the heat pipes 5622 is set larger than the number of the heat pipes 5621 in order to set the contact area of the heat pipes 5622 functioning as the second heat conduction members disposed in the second channel FP2 with the heat receiver 561 larger than the contact area of the heat pipes 5621 functioning as the first heat conduction members disposed in the first channel FP1 with the heat receiver 561. On the other hand, the contact areas with the heat receiver 561 may be adjusted by setting the radial dimension of the heat pipes 5622 larger than the radial dimension of the heat pipes 5621.

When the Peltier element is adopted as the heat conduction member, a contact area of the Peltier element disposed in the second channel FP2 with the heat receiver 561 may be set larger than a contact area of the Peltier element disposed in the first channel FP1 with the heat receiver 561.

The wavelength conversion devices 5 and 5b include the heat absorbing device 56 that lowers the temperature of the cooling gas circulating inside the housings 51 and 51b. The heat absorbing device 56 includes the heat receiver 561, the heat pipes 562, the radiator 563, and the cooling fan 564. The wavelength conversion device 5a includes the heat absorbing device 56a that lowers the temperature of a cooling gas circulating inside the housing 51. The heat absorbing device 56a includes the heat receiver 561a, the heat pipes 562, the radiator 563, and the cooling fan 564. The configuration of such heat absorbing devices 56 and 56a may be other configurations. Further, the heat absorbing devices 56 and 56a may be absent as long as it is possible to continue to supply a cooling gas having a relatively low temperature to the wavelength conversion element 52.

A cooling gas that cools the wavelength conversion element 52 circulates along the surface 521B of the substrate 521 in the opposite direction of the rotating direction of the substrate 521. On the other hand, when a wavelength conversion device includes the first partition wall 513 that partitions a cooling gas circulating to the substrate 521 and a cooling gas that has cooled the substrate 521, a circulating direction of a cooling gas circulating to the substrate 521 may be any direction.

Like the first partition wall 513, the wavelength conversion element 52 may include an opening section for leading the cooling gas to the substrate 521 and may include a partition wall that prevents a gas that has circulated from the rotating device 53 side and has cooled the substrate 521 from circulating to the rotating device 53 side again according to the rotation of the substrate 521

In the first and second embodiments, the housing 51 includes the circular arcuate section 516 having the circular shape located on the outer side of the wavelength conversion element 52 and centering on the center C of the wavelength conversion element 52 when the wavelength conversion element 52 is viewed from the +Z direction side along the rotation axis RA. This arcuate section 516 has the function of assisting circulation of a cooling gas along the circumferential direction of the wavelength conversion element 52 during the rotation. However, such an arcuate section 516 may be absent. The arcuate section 516 does not have to be formed in the circular shape and may be formed in an arcuate shape such as a semicircular shape or a quarter circular shape.

In the third embodiment, the housing 51b includes the semicircular arcuate section 516 located on the outer side of the wavelength conversion element 52 and centering on the center C2 located in the +X direction from the center C1 of the wavelength conversion element 52 when the wavelength conversion element 52 is viewed from the +Z direction side along the rotation axis RA. This arcuate section 516 has the function of assisting circulation of a cooling gas along the circumferential direction of the wavelength conversion element 52 during the rotation. However, the shape of the arcuate section 516 does not have to be the semicircular shape. The arcuate section 516 may be formed in an arcuate shape such as a quarter circular shape.

The discharge port 554 of the circulating device 55 is disposed to be shifted to the +X direction side with respect to the imaginary line VL. On the other hand, the discharge port 554 may be shifted to the −X direction side with respect to the imaginary line VL. In this case, the rotating direction of the wavelength conversion element 52 only has to be set in the opposite direction of the D direction. The discharge port 554 may be disposed on the imaginary line VL. A discharging direction of a cooling gas by the discharge port 554 may be tilted to be shifted to the +X direction side toward the +Y direction, which is a direction directed to the wavelength conversion element 52. Note that, when the rotating direction of the wavelength conversion element 52 is the opposite direction of the D direction and the discharge port 554 is located on the imaginary line VL, the discharging direction of the cooling gas by the discharge port 554 may be tilted to be shifted to the −X direction side toward the +Y direction.

The attachment member 54 that attaches the rotating device 53 to the housings 51 and 51b is formed in the cylindrical shape and is disposed on the inner side of the region where the plurality of fins 525 are formed on the substrate 521 when viewed from the +Z direction side. However, as explained above, the shape of the attachment member 54 may be a prism shape or may be other shapes. A fixing position of the attachment member 54 to the housings 51 and 51b is not limited to the inner surface of the side surface section 51B and may be the inner surface of any one of the side surface sections 51C to 51E, may be the inner surface of any one of the side surface sections 51C, 51Db, and 51E, or may be the second partition wall 514. That is, the position of the attachment member 54 when viewed from the +Z direction side is not limited to the inner side of the region where the plurality of fins 525 are formed on the substrate 521. The attachment member 54 may be disposed to such that a part of the attachment member 54 covers the fins 525.

The projectors 1, 1a, and 1b each include the three image forming devices 34 (34R, 34G, and 34B) including the liquid crystal panels functioning as the light modulating devices. However, the present invention is also applicable to a projector including two or less or four or more image forming devices.

In the image forming device 34, the liquid crystal panel of the transmission type, the light beam incident surface and the light beam emission surface of which are different, is used as the light modulating device. However, a liquid crystal panel of a reflection type, a light incident surface and a light emission surface of which are the same, may be used. Besides, a light modulating device other than liquid crystal such as a device in which a micro-mirror is used, for example, a device in which a DMD (Digital Micromirror Device) is used may be used as long as the light modulating device is capable of modulating an incident light beam and forming an image corresponding to image information.

As the optical unit 3, the configuration including the optical components and the disposition shown in FIG. 2 and FIG. 3 is illustrated. However, the optical unit 3 is not limited to this. Other configurations and disposition may be adopted.

For example, in the illumination device 31, a part of the excitation light emitted from the light source section 41 is separated by the first phase difference plate 44 and the polarization separation device 45. The part of the excitation light is combined with the fluorescent light as the blue light to generate the illumination light WL. On the other hand, rather than separating a part of the excitation light emitted from the light source section 41 and using the part of the excitation light as the blue light, another light source section that emits blue light may be adopted in addition to the light source section 41. In this case, fluorescent light generated by excitation light emitted from the light source section 41 and the blue light emitted from the other light source section may be combined to generate the illumination light WL. The green light LG and the red light LR separated from the fluorescent light may be respectively made incident on the image forming devices 34G and 34R. The blue light emitted from the other light source may be made incident on the image forming device 34B.

In the third embodiment, the center C2 of the arc of the arcuate section 516 formed by the side surface sections 51C, 51Db, and 51E is shifted to the +X direction side with respect to the center C1 of the wavelength conversion element 52 (the substrate 521). In other words, the wavelength conversion element 52 (the substrate 521) is disposed in the space S3 surrounded by the side surface sections 51C, 51Db, and 51E such that the center C1 is shifted to the −X direction side with respect to the center C2. However, the center C2 may be shifted to the −X direction side with respect to the center C1. Further, the center C2 may be shifted to either one of the +Y direction side and the −Y direction side with respect to the center C1.

The wavelength conversion devices 5, 5a, and 5b and the illumination device 31 in the embodiments are respectively applied to the projectors 1, 1a, and 1b. However, these wavelength conversion devices 5, 5a, and 5b and the illumination device 31 can also be applied to, for example, a lighting fixture and a light source device of an automobile.

The entire disclosure of Japanese Patent Application No. 2015-204367, filed on Oct. 16, 2015, Japanese Patent Application No. 2015-204368, filed on Oct. 16, 2015 and Japanese Patent Application No. 2015-204369, filed on Oct. 16, 2015 are expressly incorporated by reference herein.

What is claimed is:

1. A wavelength conversion device comprising:
a substrate including a phosphor layer in which a phosphor is included;
a rotating device configured to rotate the substrate about a rotation axis;
a circulating device that circulates a cooling gas to the substrate; and
a housing configured to house the substrate and the circulating device, wherein
the housing includes a partition wall configured to separate a first space in which the cooling gas is circulated to the substrate by the circulating device and a second space in which the substrate is disposed,
the partition wall includes an opening section for circulating the cooling gas to the substrate,
the rotation axis extends through the opening section of the partition wall, and
the cooling gas is radially delivered to the second space from the first space by the rotation of the substrate.

2. The wavelength conversion device according to claim 1, wherein
an opening shape of the opening section substantially coincides with a rotation range of the substrate.

3. The wavelength conversion device according to claim 1, wherein the substrate includes, on a surface against which the cooling gas is blown, a plurality of fins extending from a center side toward an outer side of the substrate.

4. The wavelength conversion device according to claim 1, wherein when the substrate is viewed along the rotation axis of the substrate, in a part in a circumferential direction of the substrate, the cooling gas circulated by the circulating device circulates in an opposite direction of a rotating direction of the substrate in the part.

5. An illumination device comprising:
the wavelength conversion device according to claim 1; and
a light source section configured to emit light made incident on the wavelength conversion device.

6. The wavelength conversion device according to claim 4, wherein, when the substrate is viewed along the rotation axis, the housing includes an arcuate section located on an outer side of the substrate and extending along a circumferential direction during the rotation of the substrate.

7. The wavelength conversion device according to claim 6, wherein
the circulating device includes a discharge port for discharging the cooling gas, and
when the substrate is viewed along the rotation axis, the discharge port is disposed to be shifted with respect to an imaginary line that passes a center of the substrate and crosses the arcuate section.

8. A projector comprising:
the illumination device according to claim 5;
an image forming device configured to form an image using light emitted from the illumination device; and
a projection optical device configured to project the formed image.

9. A wavelength conversion device comprising:
a substrate configured to rotate around a rotation axis extending along a first direction;
a plurality of fins located on a first surface, which is one surface on the substrate, and extending from a center side toward an outer side of the substrate;
a phosphor layer located in either one of the first surface and a second surface on an opposite side of the first surface;
a rotating device configured to rotate the substrate;
a delivering device configured to deliver the cooling gas to the first surface; and
a housing in which the substrate is disposed on an inner side, wherein
the housing includes:
a first side surface section opposed to the second surface; and
a second side surface section that crosses the first side surface section and includes an arcuate section extending along a circumferential direction during the rotation of the substrate disposed on the inner side when viewed along the first direction,
a radius from a center of an arc of the arcuate section is larger than a radius of the substrate,
the center of the arc of the arcuate section is located spaced apart from a rotation axis of the substrate, and
the substrate is rotated counterclockwise by the rotating device when viewed from the first direction side.

10. The wavelength conversion device according to claim 9, wherein
the housing includes a partition wall opposed to the first side surface section across the substrate and connected to the second side surface, and
the partition wall includes an opening section for circulating the cooling gas to the first surface.

* * * * *